(12) United States Patent
Huang et al.

(10) Patent No.: US 11,456,529 B2
(45) Date of Patent: Sep. 27, 2022

(54) ANTENNA INTEGRATED DISPLAY SCREEN, DISPLAY APPARATUS AND ELECTRONIC EQUIPMENT

(71) Applicant: YUNGU (GU'AN) TECHNOLOGY CO., LTD., Langfang (CN)

(72) Inventors: Huan-Chu Huang, Taoyuan (CN); Jie Wu, Langfang (CN); Shuang Cui, Langfang (CN)

(73) Assignee: YUNGU (GU'AN) TECHNOLOGY CO., LTD., Hebei (CN)

( * ) Notice: Subject to any disclaimer, the term of this patent is extended or adjusted under 35 U.S.C. 154(b) by 0 days.

(21) Appl. No.: 17/733,638

(22) Filed: Apr. 29, 2022

(65) Prior Publication Data
US 2022/0263238 A1    Aug. 18, 2022

(30) Foreign Application Priority Data

Feb. 15, 2022   (CN) .......................... 202210135129.8

(51) Int. Cl.
| | | |
|---|---|---|
| *H01Q 1/22* | (2006.01) | |
| *H01Q 1/52* | (2006.01) | |
| *G06F 3/041* | (2006.01) | |
| *H04M 1/02* | (2006.01) | |
| *H01Q 21/24* | (2006.01) | |

(52) U.S. Cl.
CPC .......... *H01Q 1/523* (2013.01); *G06F 3/0412* (2013.01); *H01Q 1/2283* (2013.01); *H01Q 21/24* (2013.01); *H04M 1/0266* (2013.01); *H04M 2201/38* (2013.01)

(58) Field of Classification Search
CPC ...... H01Q 1/523; H01Q 1/2283; H01Q 21/24; H01Q 1/243; G06F 3/0412; H04M 1/0266; H04M 2201/38; H01L 27/323; H01L 2223/6677; H01L 23/66
See application file for complete search history.

(56) References Cited

U.S. PATENT DOCUMENTS

| | | | |
|---|---|---|---|
| 2017/0222315 A1 | 8/2017 | Hozouri | |
| 2021/0200366 A1* | 7/2021 | Bok | .................... H01L 27/3234 |
| 2021/0203070 A1 | 7/2021 | Wu et al. | |

(Continued)

FOREIGN PATENT DOCUMENTS

| | | |
|---|---|---|
| CN | 101662068 A | 3/2010 |
| CN | 201781071 U | 3/2011 |
| CN | 104052529 A | 9/2014 |

(Continued)

OTHER PUBLICATIONS

Chinese First Office Action 100191 (CN Application No. 202210135129.8) and Search Result with English Translation, dated Mar. 22, 2022, 18 pages.

(Continued)

*Primary Examiner* — David E Lotter
(74) *Attorney, Agent, or Firm* — Adsero IP

(57) ABSTRACT

The present disclosure relates to a display screen with an integrated antenna, a display apparatus and electronic equipment. The display screen includes: a plurality of antenna elements, including first antenna elements and second antenna elements with different polarization directions; the first antenna elements and the second antenna elements are arranged alternately.

13 Claims, 22 Drawing Sheets

(56) References Cited

U.S. PATENT DOCUMENTS

2021/0359392 A1* 11/2021 Won ................. H01Q 21/28

FOREIGN PATENT DOCUMENTS

| | | | |
|---|---|---|---|
| CN | 106099390 | A | 11/2016 |
| CN | 107911126 | A | 4/2018 |
| CN | 109904599 | A | 6/2019 |
| CN | 110350294 | A | 10/2019 |
| CN | 110444855 | A | 11/2019 |
| CN | 110534924 | A | 12/2019 |
| CN | 110768006 | A | 2/2020 |
| CN | 111614801 | A | 9/2020 |
| CN | 211743382 | U | 10/2020 |
| CN | 112310658 | A | 2/2021 |
| CN | 112578928 | A | 3/2021 |
| CN | 112713383 | A | 4/2021 |
| CN | 112864570 | A | 5/2021 |
| CN | 112864582 | A | 5/2021 |
| CN | 112929475 | A | 6/2021 |
| CN | 112993543 | A | 6/2021 |
| TW | 202125901 | A | 7/2021 |
| WO | 2020253938 | A1 | 12/2020 |
| WO | 2021118198 | A1 | 6/2021 |

OTHER PUBLICATIONS

Chinese Supplementary Search Result with English Translation, dated Mar. 26, 2022, 3 pages.

Antenna-on-Display (AoD) for Millimeter-wave 5G Mobile Devices, J.Park and W.Hong, 2019 IEEE International Symposium on Antennas and Propagation and USNC-URSI Radio Science Meeting, 2019,pp. 603-604.

Chinese General notice of pre-trial opinion (CN Application No. 202210135129.8) dated Feb. 9, 2022, 20 pages.

Office Action issued for Taiwan's Patent Application No. 111116497, dated Jun. 6, 2022, 9pages including English translation.

* cited by examiner

ANTENNA INTEGRATED DISPLAY SCREEN, DISPLAY APPARATUS AND ELECTRONIC EQUIPMENT

CROSS REFERENCE TO RELATED APPLICATIONS

This application claims priority to Chinese Patent Application No. 2022101351298, entitled "ANTENNA INTEGRATED DISPLAY SCREEN, DISPLAY APPARATUS AND ELECTRONIC EQUIPMENT" filed on Feb. 15, 2022, the contents of which is incorporated by reference in its entirety.

TECHNICAL FIELD

The present disclosure relates to the field of display technologies.

BACKGROUND

Two frequency ranges, namely Frequency Range 1 (FR1) and Frequency Range 2 (FR2), are mainly used in the $5^{th}$ generation mobile communications (5G). According to the $3^{rd}$ generation partnership project (3GPP), at present, FR2 of the 5G ranges from 24.25 GHz to 52.6 GHz, which is a millimeter wave band; while FR1 of the 5G ranges from 450 MHz to 7.125 GHz, which is a non-millimeter wave band.

SUMMARY

Embodiments of the present disclosure provide an antenna integrated display screen, an apparatus and electronic equipment that can improve the quality of wireless communication with respect to the above technical problems.

In a first aspect, the present application provides an antenna integrated display screen. The display screen includes: a plurality of antenna elements, including first antenna elements and second antenna elements having a different polarization direction from that of the first antenna elements. A plurality of the first antenna and a plurality of the second antenna are arranged alternately.

In a second aspect, the present application provides a display apparatus, wherein the display apparatus includes:
the display screen according to the first aspect;
a Flexible Printed Circuit (FPC) electrically connected to the display screen; and
a Radio Frequency Integrated Circuit (RFIC), the RFIC being electrically connected to the first antenna element and the second antenna element respectively.

In a third aspect, the present application provides electronic equipment, wherein the electronic equipment includes:
the display apparatus according to the second aspect; and
a system motherboard provided with a baseband processing unit and an intermediate-frequency circuit, the baseband processing unit being electrically connected to the RFIC via the intermediate-frequency circuit.

According to the antenna integrated display screen, the display apparatus and the electronic equipment, the display screen includes a plurality of antenna elements, the plurality of antenna elements include first antenna elements and second antenna elements with different polarization directions, at least one of the first antenna elements constitutes a first antenna and at least one of the second antenna elements constitutes a second antenna, and the first antenna and the second antenna are arranged alternately. In this way, the first antenna and the second antenna may be arranged at different positions to increase an antenna beam coverage, so as to reduce communication dead zones to improve the quality of communication and user wireless experience. In this way, the probability of being blocked (e.g., held in hand) and degrading the performance of all antennas may also be reduced, so the user wireless experience may be enhanced. Moreover, the design may also form polarization complementarity to reduce the probability of polarization mismatch of wireless electromagnetic waves, and also reduce communication dead zones to improve the quality of communication and user experience. Besides, based on the design, mutual coupling between the first antenna and the second antenna can be reduced, thereby improving the antenna performance and user wireless experience.

Details of one or more embodiments of the present application are set forth in the following figures and description. Other features, objects and advantages of the present application will become apparent from the description, the figures and the claims.

BRIEF DESCRIPTION OF THE DRAWINGS

In order to more clearly illustrate the technical solutions in embodiments of the present application or the conventional art, the accompanying drawings used in the description of the embodiments or the conventional art will be briefly introduced below. It is apparent that, the accompanying drawings in the following description are only some embodiments of the present application, and other drawings can be obtained by those of ordinary skill in the art from the provided drawings without creative efforts.

DETAILED DESCRIPTION OF THE EMBODIMENTS

Figure 1:
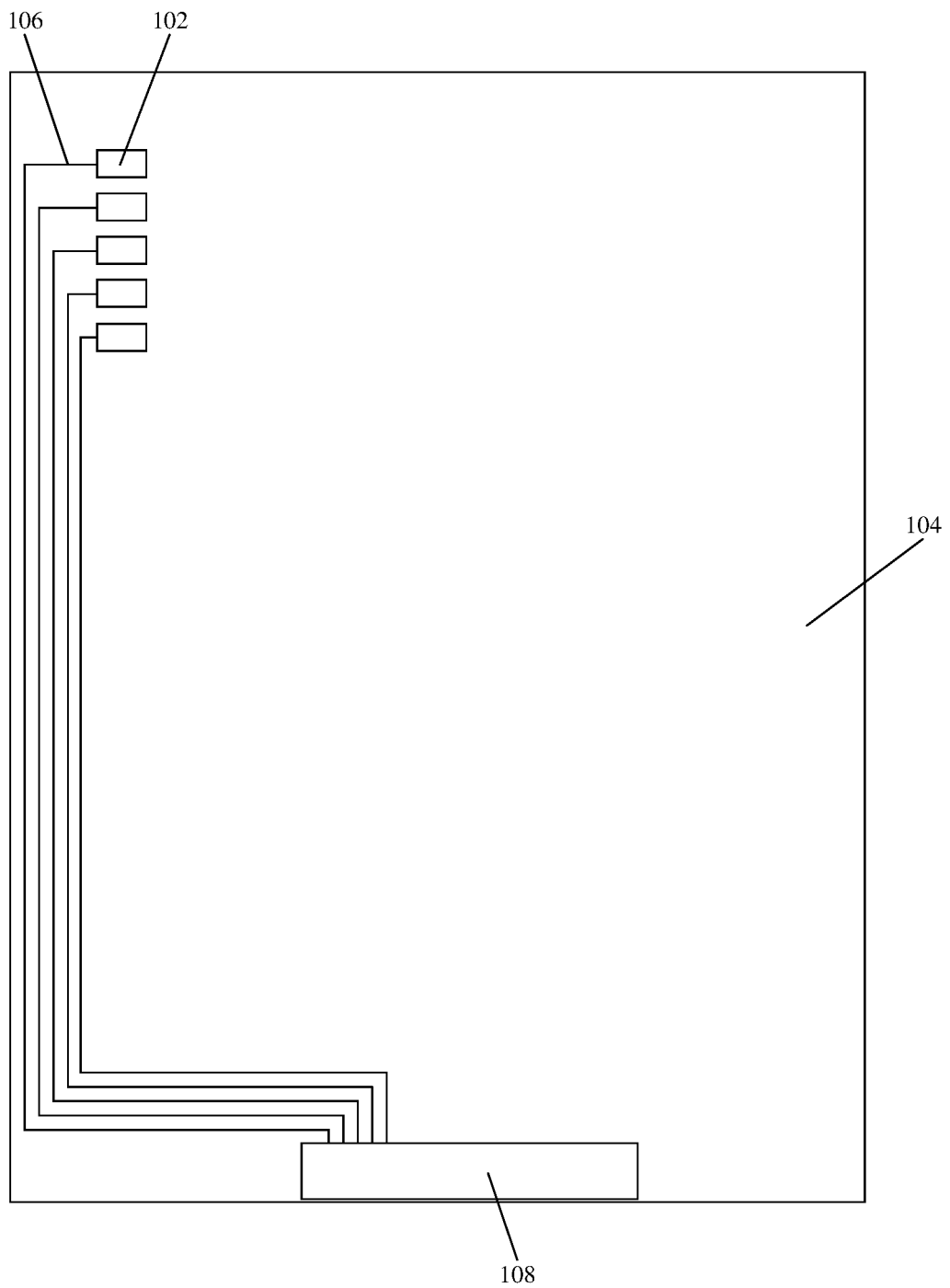
FIG. 1 is a schematic structural diagram of electronic equipment.

To facilitate understanding of the present invention, a more comprehensive description of the present invention will be given below with reference to the relevant accompanying drawings. Preferred embodiments of the present invention are given in the drawings. However, the present invention may be implemented in many different forms and is not limited to the embodiments described herein. Rather, these embodiments are provided to make the contents disclosed in the present invention more fully understood.

It is to be noted that, when one element is referred to as "fixed to" or "arranged on" another element, it may be directly disposed on another element or an intermediate element may exist. When one element is considered to be "connected to" another element, it may be directly connected to another element or an intermediate element may co-exist or electrically coupled to or electrically connected to another element. The terms "vertical", "horizontal", "upper", "lower", "left", "right" used herein and similar expressions used herein are for illustrative purposes only and do not imply that they are the only means of implementation.

Herein, spatially related terms such as "upper" and "lower" are defined with reference to the drawings. Therefore, it is to be understood that "upper" and "lower" are used interchangeably. It is to be understood that, when one layer is referred to as "on" another layer, it may be formed directly on another layer, or an intermediate layer may exist. Therefore, it is to be understood that, when one layer is referred to as "directly" "on" another layer, no intermediate layer is inserted therebetween.

Hereinafter, although the terms such as "first," "second," and so on can be used to describe various components, such components do not have to be limited to the terms above. The terms above are used only to distinguish one component from another. It is also to be understood that expressions used in the singular form include those in the plural form, unless the singular form has an obviously different meaning in the context. In addition, in the following embodiments, it is also to be understood that the terms "comprise/include" and/or "have" used here indicate the presence of the stated feature or component, but do not exclude the presence or addition of one or more other features or components.

As used in the application text, the term "and/or" may include any and all combinations of one or more related listed items. When an expression such as "at least one of . . . " follows a column of elements, it modifies the entire column of elements, not individual elements in that column.

Unless defined otherwise, all technical and scientific terms used herein have the same meanings as would generally understood by those skilled in the technical field of the present invention. The terms used herein in the specification of the application are for the purpose of describing specific embodiments only, and are not intended to limit the present application. The term "and/or" used herein includes any and all combinations of one or more related listed items.

It is to be further understood that the term "comprise/include" or "have" specifies the presence of the features, integers, steps, operations, components, portions, or their combinations, but does not exclude the possibility of presence or addition of one or more of other features, integers, steps, operations, components, portions, or their combinations.

The millimeter wave band is better than the non-millimeter wave band in the bandwidths, channel capacity, data transmission rates and imaging granularity, so the millimeter wave is more and more widely used. However, compared with the non-millimeter wave, the millimeter wave has higher propagation losses, and the millimeter wave beams generally have narrower beam widths; thus, millimeter wave wireless communication often has more obvious communication dead zones. In addition, handheld wireless mobile terminals, when held, antennas in apparatuses, such as millimeter-wave antennas, are generally blocked which significantly reduces the performance of the antennas and deteriorates user wireless experience.

In recent years, the occurrence rates of the display screens and screen-to-body ratios in most wireless communication electronic apparatuses have got higher and higher, which may generally limit placement locations of the antennas in the apparatuses. Besides, the antennas are generally more easily blocked in use (for example, when they are held or placed on a metal table), which results in significant deterioration of the performance of the antennas and affects the user wireless experience. In view of this, a design manner of integrating antennas to displays, such as Antenna-on-Display (AoD), has become a possible development trend of antenna design in display apparatus with antennas integrated.

At present, the mainstream millimeter-wave antenna design in wireless mobile terminals is an antenna array composed of more than two antenna elements to improve antenna gain for overcoming higher propagation losses of the millimeter wave bands (than the non-millimeter wave bands). However, as the antenna arrays have a number of narrow beams, beam scanning is generally required to attain wider spatial coverage for ensuring good wireless signal coverage, so as to satisfy user wireless experience. In addition, when holding wireless mobile terminals, hands generally easily block antennas in apparatuses, such as millimeter-wave antennas, which significantly degrades the performance of the antennas and deteriorates user wireless experience. Moreover, millimeter waves (compared with non-millimeter waves) are scattered more frequently and intensely in wireless transmission, so the match level of wireless electromagnetic wave polarizations also plays a critical role in the quality of millimeter wave wireless communication.

The occurrence rates of the display screens and screen-to-body ratios in most wireless communication electronic apparatuses have got higher and higher, which may generally limit placement locations of the antennas in the apparatuses. Therefore, integration of antennas into the display screens are considered. Specifically, when a millimeter-wave antenna array is integrated to a display apparatus, millimeter-wave antenna elements in the millimeter-wave antenna array are respectively connected to a millimeter-wave RFIC. As shown in FIG. 1, a plurality of millimeter-wave antenna elements 102 are spaced in electronic equipment 104, and are electrically connected to a millimeter-wave RFIC 108 via a millimeter-wave RF signal line 106.

However, the millimeter-wave antenna elements 102 have a same polarization direction, so polarization mismatch for receiving wireless electromagnetic waves is easy to occur, resulting in large wireless communication dead zones. As a result, users will suffer from poor wireless experience. Moreover, multiple-input and multiple-output (MIMO) cannot be achieved, resulting in the failure to further improve the wireless data transmission rates, thereby affecting the user experience again. To sum up, the quality of wireless communication of the electronic equipment 104 is indeed required to be improved. However, if a plurality of RFICs are used to improve the quality of communication, there may be negative effects on product competitiveness, such as increased system costs and product sizes.

Based on the above reasons, the present invention provides an antenna integrated display screen, a display apparatus and electronic equipment. The display screen includes a plurality of antenna elements, the plurality of antenna elements include first antenna elements and second antenna elements with different polarization directions, at least one of the first antenna elements constitutes a first antenna and at least one of the second antenna elements constitutes a second antenna, and the first antenna and the second antenna are arranged alternately. The first antenna elements and the second antenna elements with different polarization directions are arranged alternately, so that the first antenna and the second antenna may be arranged at different locations to increase an antenna beam coverage, so as to reduce communication dead zones to improve the quality of communication and user wireless experience. In this way, the probability of being blocked (e.g., held in hand) and degrading the performance of all antennas with a same polarization direction may also be reduced, so the user wireless experience may be enhanced. Moreover, the design may also achieve polarization complementarity to reduce the probability of polarization mismatch of wireless electromagnetic waves, and also reduce communication dead zones to improve the quality of communication and user experience. Besides, based on the design, mutual coupling between the first antenna and the second antenna can be reduced, thereby improving the antenna performance and user wireless experience.

The display screen according to the embodiment of the present application may be an Organic Light-Emitting Diode (OLED) display screen, a Quantum Dot Light Emitting Diodes (QLED) display panel, a Liquid Crystal Display (LCD) display screen or the like, and applied to electronic equipment such as mobile phone terminals, tablet computers, laptops, wearable equipment and vehicle-mounted equipment.

Figure 2:
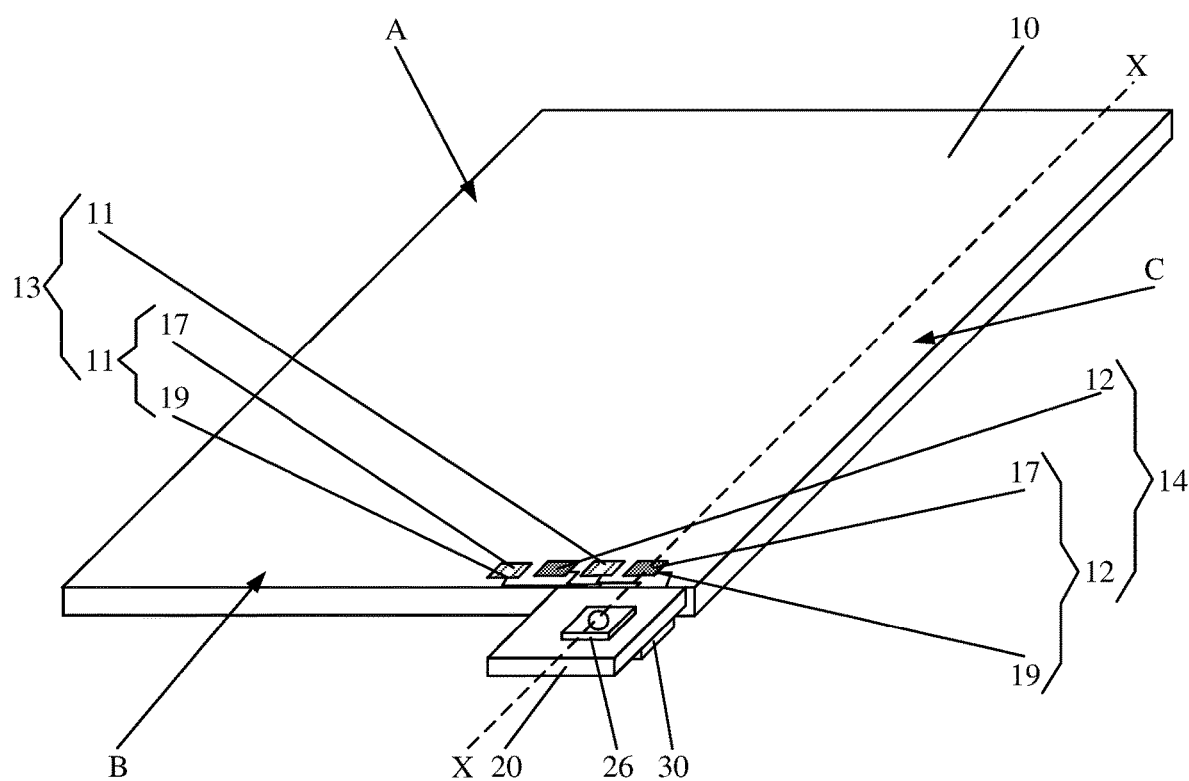
FIG. 2 is a schematic structural diagram of a display apparatus.

Referring to FIG. 2, an embodiment of the present application provides an antenna integrated display screen, including a plurality of antenna elements. The plurality of antenna elements include first antenna elements 11 and second antenna elements 12 with different polarization directions. At least one of the first antenna elements constitutes a first antenna 13 and at least one of the second antenna elements 12 constitutes a second antenna 14. The first antenna 13 and the second antenna 14 are arranged alternately.

The display screen includes first antenna elements and second antenna elements with different polarization directions, at least one of the first antenna elements constitutes a first antenna and at least one of the second antenna elements constitutes a second antenna, and the first antenna and the second antenna are arranged alternately. Exemplarily, a plurality of first antenna elements and a plurality of second antenna elements are arranged alternately. In this way, the first antenna and the second antenna may be arranged at different positions to increase an antenna beam coverage, so as to reduce communication dead zones to improve the quality of communication and user wireless experience. In this way, the probability of being blocked (e.g., held in hand) and degrading the performance of all antennas may also be reduced, so the user wireless experience may be enhanced. Moreover, the design may also achieve polarization complementarity to reduce the probability of polarization mismatch of wireless electromagnetic waves, and also reduce communication dead zones to improve the quality of communication and user experience. Besides, based on the design, mutual coupling between the first antenna and the second antenna can be reduced, thereby improving the antenna performance and user wireless experience.

In some embodiments of the present application, as shown in FIG. 2, the polarization direction of the first antenna element 11 is orthogonal to the polarization direction of the second antenna element 12. Exemplarily, the polarization direction of each of the first antenna elements 11 is orthogonal to the polarization direction of each of the second antenna elements 12. In this way, on the premise that the polarization direction of the first antenna element 11 is different from the polarization direction of the second antenna element 12, mutual coupling between the first antenna element 11 and the second antenna element 12 can be prevented to the maximum extent and the quality of communication can be effectively improved.

The polarization direction of the first antenna element 11 is a time-varying trajectory direction of an electric field tip of an electromagnetic wave radiated by the first antenna element 11, and the polarization direction of the second antenna element 12 is a time-varying trajectory direction of an electric field tip of an electromagnetic wave radiated by the second antenna element 12.

For example, the polarization direction of the first antenna element 11 is longitudinal, and the polarization direction of the second antenna element 12 is transverse; or the polarization direction of the first antenna element 11 is transverse and the polarization direction of the second antenna element 12 is longitudinal.

In other embodiments, the polarization direction of the first antenna element 11 and the polarization direction of the second antenna element 12 may also be at other angles. That is, the polarization direction of the first antenna element 11 is not orthogonal to the polarization direction of the second antenna element 12.

In some embodiments of the present application, as shown in FIG. 2, the display screen 10 includes an edge region, and at least one of the first antenna 13 and the second antenna 14 is arranged in the edge region of the display screen 10. In other words, at least a part of the first antenna elements 11 and the second antenna elements 12 is arranged in the edge region of the display screen 10. More specifically, the plurality of the first antenna elements 11 and the second antenna elements 12 are arranged in the edge region of the display screen 10. In this way, signal lines connected to the first antenna 13 and the second antenna 14 respectively are also arranged in a region adjacent to an edge of the display screen 10, which may prevent the influence on a display effect of the display screen 10.

The edge region of the display screen 10 refers to a region in the display screen 10 adjacent to a lateral facade of the display screen 10. Specifically, a distance from the antenna arranged in the edge region of the display screen 10 to the lateral facade of the display screen 10 is less than a distance to a center of the display screen 10. In practical applications, the display screen 10 includes a display region and a non-display region at least partially surrounding the display region. The edge region of the display screen 10 may include the non-display region as well as a partial region in the display region adjacent to the non-display region.

For example, as shown in FIG. 2, the first antenna 13 and the second antenna 14 are arranged alternately in the edge region of the display screen 10.

In some embodiments of the present application, the first antenna 13 and the second antenna 14 may be arranged in any region of the display screen 10, and may be arranged alternately in the any region. That is, at least one of the first antenna and the second antenna may be arranged in the display region of the display screen 10; at least one of the first antenna and the second antenna may be arranged in the non-display region of the display screen 10; the first antenna is arranged in the display region of the display screen 10, and the second antenna is arranged in the non-display region of the display screen 10. The first antenna elements 11 and the second antenna elements 12 are assembled in the display screen 10 or disposed outside the display screen 10.

In some embodiments of the present application, an operating frequency band of the first antenna 13 is the same as that of the second antenna 14, and more specifically, an operating frequency band of the first antenna element 11 is the same as that of the second antenna element 12, which is beneficial to improve the gains of the antenna array, matching levels of polarizations, spatial coverage of the beams and strength strengths of received signals, and to reduce a degree of deterioration of the antenna performance caused by handholding or other blocking.

The frequency bands are frequency ranges of electromagnetic waves, which may be classified into: very low frequencies in a frequency range from 3 kHz to 30 kHz, corresponding to very long waves in a corresponding wavelength range from 100 km to 10 km; low frequencies in a frequency range from 30 kHz to 300 kHz, corresponding to long waves in a corresponding wavelength range from 10 km to 1 km; medium frequencies in a frequency range from 300 kHz to 3000 kHz, corresponding to medium waves in a corresponding wavelength range from 1000 m to 100 m; high frequencies in a frequency range from 3 MHz to 30 MHz, corresponding to short waves in a corresponding wavelength range from 100 m to 10 m; very high frequencies in a frequency range from 30 MHz to 300 MHz, corresponding to meter waves in a corresponding wavelength range from 10 m to 1 m; ultrahigh frequencies in a frequency range from 300 MHz to 3000 MHz, corresponding to decimeter waves in a corresponding wavelength range from 100 cm to 10 cm; superhigh frequencies in a frequency range from 3 GHz to 30 GHz, corresponding to centimeter waves in a corresponding wavelength range from 10 cm to 1 cm; extremely-high frequencies in a frequency range from 30 GHz to 300 GHz, corresponding to millimeter waves in a corresponding wavelength range from 10 mm to 1 mm; and tremendously-high frequencies in a frequency range from 300 GHz to 3000 GHz, corresponding to deci-millimeter waves in a corresponding wavelength range from 1 mm to 0.1 mm.

In one implementation of the present application, the first antenna elements 11 and the second antenna elements 12 are configured as millimeter-wave antennas. For example, the operating frequency band of the first antenna element 11 is a 5G millimeter wave band, and the operating frequency band of the second antenna element 12 is a 5G millimeter wave band. A current frequency range of the 5G millimeter wave band is from 24.25 GHz to 52.60 GHz.

In another implementation of the present application, the first antenna element 11 and the second antenna element 12 are configured as non-millimeter-wave antennas. For example, the operating frequency band of the first antenna element 11 is a 5G non-millimeter wave band, and the operating frequency band of the second antenna element 12 is a 5G non-millimeter wave band. A current frequency range of the 5G non-millimeter wave band is from 410 MHz to 7.125 GHz.

In other embodiments, the operating frequency band of the first antenna 13 is different from the operating frequency band of the second antenna 14. Specifically, in the first antenna element 11 and the second antenna element 12, one is configured as a millimeter-wave antenna, and the other is configured as a non-millimeter-wave antenna.

It should be understood that a millimeter wave antenna refers to an antenna whose operating frequency band can cover the millimeter wave band, and a non-millimeter wave antenna refers to an antenna whose operating frequency band can cover the non-millimeter wave band.

When the first antenna element 11 and the second antenna element 12 are configured as millimeter-wave antennas, as shown in FIG. 2, a plurality of first antenna elements 11 constitute a first antenna 13, and a plurality of second antenna elements 12 constitute a second antenna 14. In this way, with respect to high transmission losses and high blockage sensitivity of the millimeter waves, a millimeter-wave antenna array is composed of a plurality of millimeter-wave antenna elements, which may improve spatial coverage of the beams of the antenna array and strength strengths of received signals, and reduce a degree of deterioration of the antenna performance caused by handholding or other blocking, so as to improve the quality of wireless communication.

Figure 3:
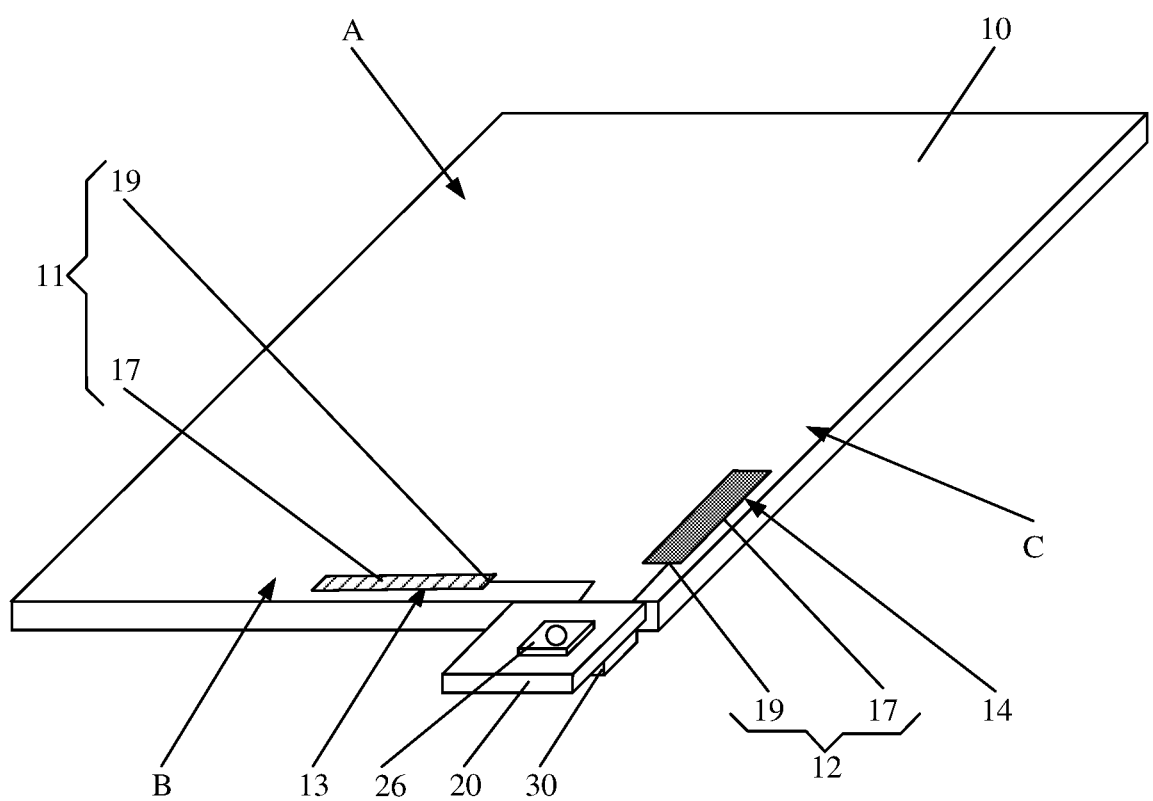
FIG. 3 is a schematic structural diagram of the display apparatus.

When the first antenna element 11 and the second antenna element 12 are configured as non-millimeter-wave antennas, as shown in FIG. 3, one first antenna element 11 constitutes a first antenna 13, and one second antenna element 12 constitutes a second antenna 14.

In some embodiments of the present application, as shown in FIG. 2, a plurality of first antenna elements 11 and a plurality of second antenna elements 12 are arranged alternately, so as to prevent mutual coupling between two adjacent antenna elements to improve the quality of communication of the first antenna elements 11 and the second antenna elements 12.

In one implementation of the present application, as shown in FIG. 2, the each first antenna element 11 and each the second antenna element 12 are arranged alternately.

Specifically, as shown in FIG. 2, the edge region of the display screen 10 includes a first edge region A, a second edge region B and a third edge region C connected in sequence, and the first edge region A is opposite to the third edge region C. For example, a length direction of the first edge region A is parallel to a length direction of the third edge region C; and/or the length direction of the first edge region A is not parallel to a length direction of the second edge region B; and/or the length direction of the third edge region C is not parallel to the length direction of the second edge region B.

Correspondingly, the first antenna element 11 and the second antenna element 12 may be arranged in the following three manners.

Figure 4:
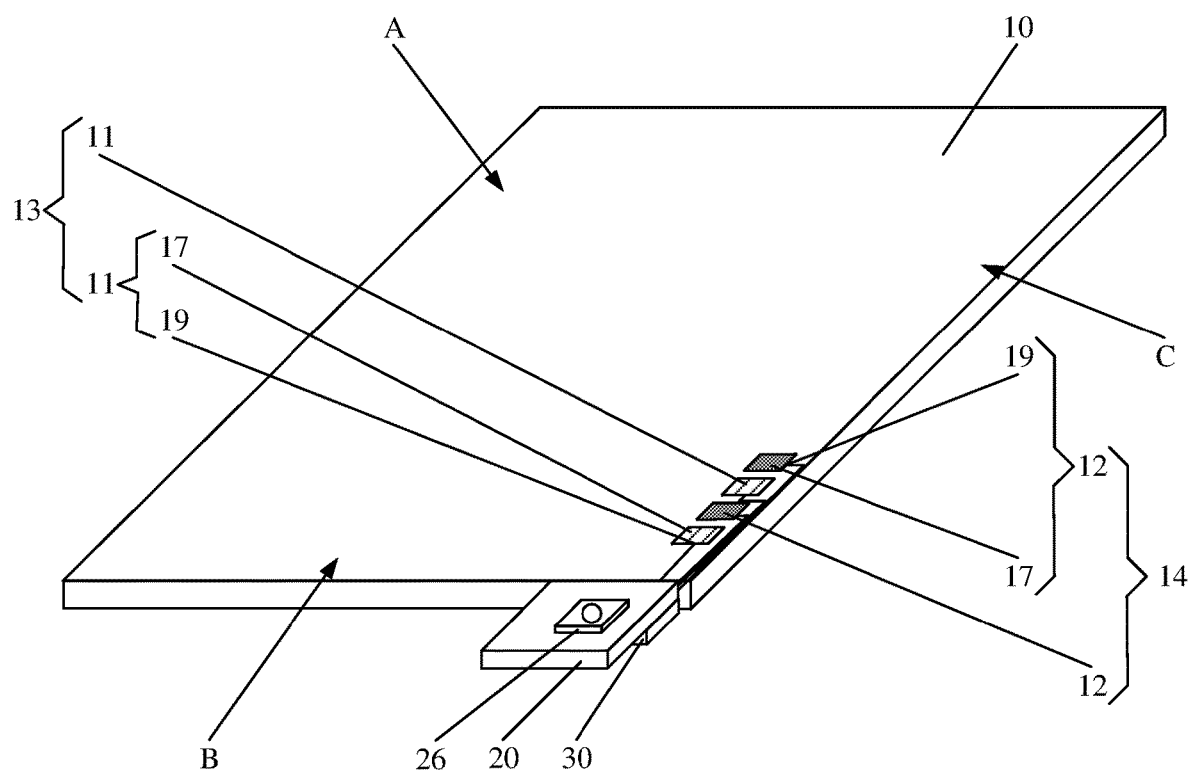
FIG. 4 is a schematic structural diagram of the display apparatus.

In the first manner, the first antenna element 11 and the second antenna element 12 are arranged alternately in one edge region of the display screen 10. For example, as shown in FIG. 2, the first antenna elements 11 and the second antenna elements 12 are arranged alternately along a first direction in the second edge region B of the display screen 10. As shown in FIG. 4, the first antenna elements 11 and the second antenna elements 12 are arranged alternately along a second direction in the third edge region C of the display screen 10.

Figure 5:
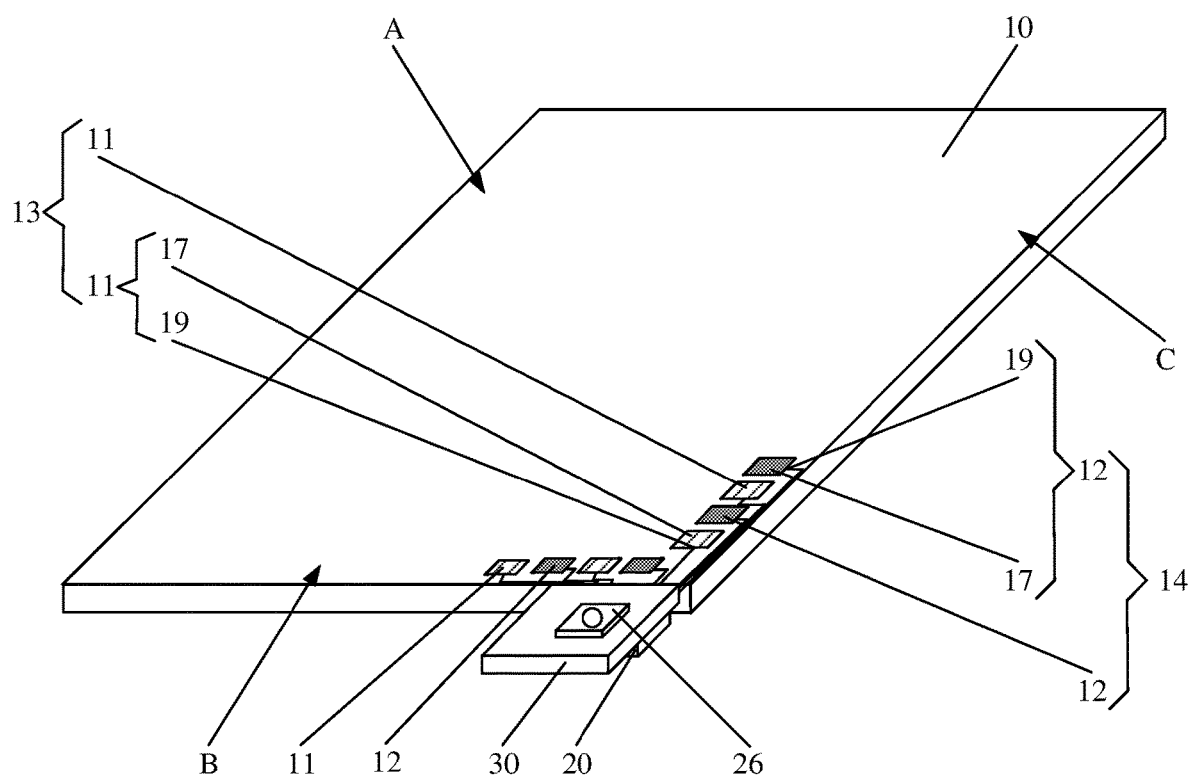
FIG. 5 is a schematic structural diagram of the display apparatus.

In the second manner, the first antenna element 11 and the second antenna element 12 are arranged alternately in two edge regions of the display screen 10. For example, as shown in FIG. 5, the first antenna elements 11 and the second antenna elements 12 are arranged alternately along the first direction in the second edge region B of the display screen 10 and the first antenna elements 11 and the second antenna elements 12 are arranged alternately along the second direction in the third edge region C of the display screen 10. In this way, spatial coverage of the beams of the antenna arrays and strength strengths of received signals may be improved, and a degree of deterioration of the antenna performance caused by handholding or other blocking may be reduced, so as to improve the quality of wireless communication.

Figure 6:
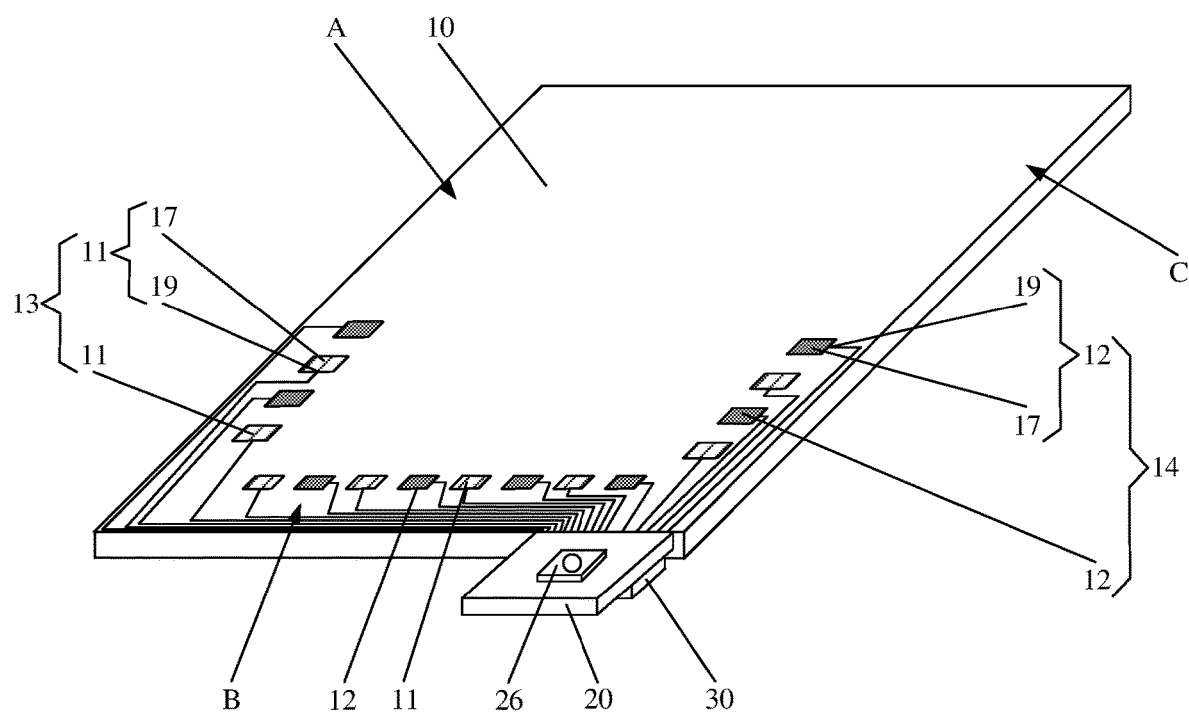
FIG. 6 is a schematic structural diagram of the display apparatus.

In the third manner, the first antenna element 11 and the second antenna element 12 are arranged alternately in three edge regions of the display screen 10. For example, as shown in FIG. 6, the first antenna elements 11 and the second antenna elements 12 are arranged alternately along the second direction in the first edge region A of the display screen 10, the first antenna elements 11 and the second antenna elements 12 are arranged alternately along the first direction in the second edge region B of the display screen 10 and the first antenna elements 11 and the second antenna elements 12 are arranged alternately along the second direction in the third edge region C of the display screen 10. In this way, the three edge regions of the display screen 10 are all provided with antenna elements, and the antenna elements are arranged in a wide range, which can effectively reduce a degree of deterioration of the performance of the blocked antenna and expand spatial coverage of beams, so as to improve the quality of wireless communication and user wireless experience.

Exemplarily, the first direction is a width direction of the display screen 10, the second direction is a length direction of the display screen 10, and the first direction is orthogonal to the second direction.

In the above embodiment, the antenna element adjacent to the first antenna element 11 is the second antenna element 12, and the antenna element 11 adjacent to the second antenna element 12 is the first antenna element 11.

Figure 7:
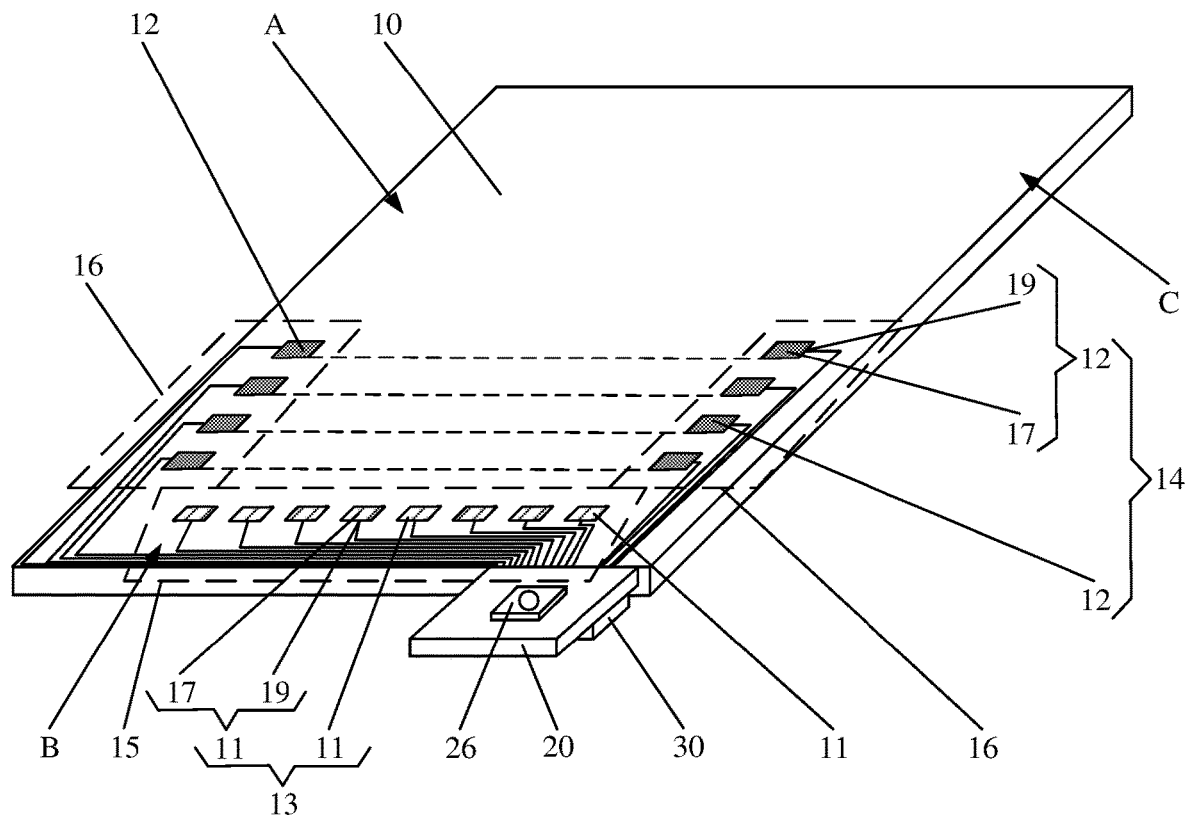
FIG. 7 is a schematic structural diagram of the display apparatus.

In another implementation of the present application, as shown in FIG. 7, the plurality of first antenna elements 11 include at least one first antenna element group 15. Each first antenna element group 15 includes at least two first antenna elements 11. The plurality of second antenna elements 12 include at least one second antenna element group 16. Each second antenna element group 16 includes at least two second antenna elements 12. The first antenna element group 15 and the second antenna element group 16 are arranged alternately.

For example, as shown in FIG. 7, a plurality of second antenna elements 12 are arranged along the second direction in the first edge region A of the display screen 10 to form a second antenna element group 16. A plurality of second antenna elements 12 are arranged along the second direction in the third edge region C of the display screen 10 to form another second antenna element group 16. A plurality of first antenna elements 11 are arranged along the first direction in the second edge region B of the display screen 10 to form a first antenna element group 15. The first antenna element group 15 is located between the two second antenna element groups 16. That is, the first antenna element group 15 and the second antenna element group 16 are arranged alternately. In the example shown in FIG. 7, the first antenna element group 15 and the second antenna element group 16 are alternately arranged in the first direction.

Figure 8:
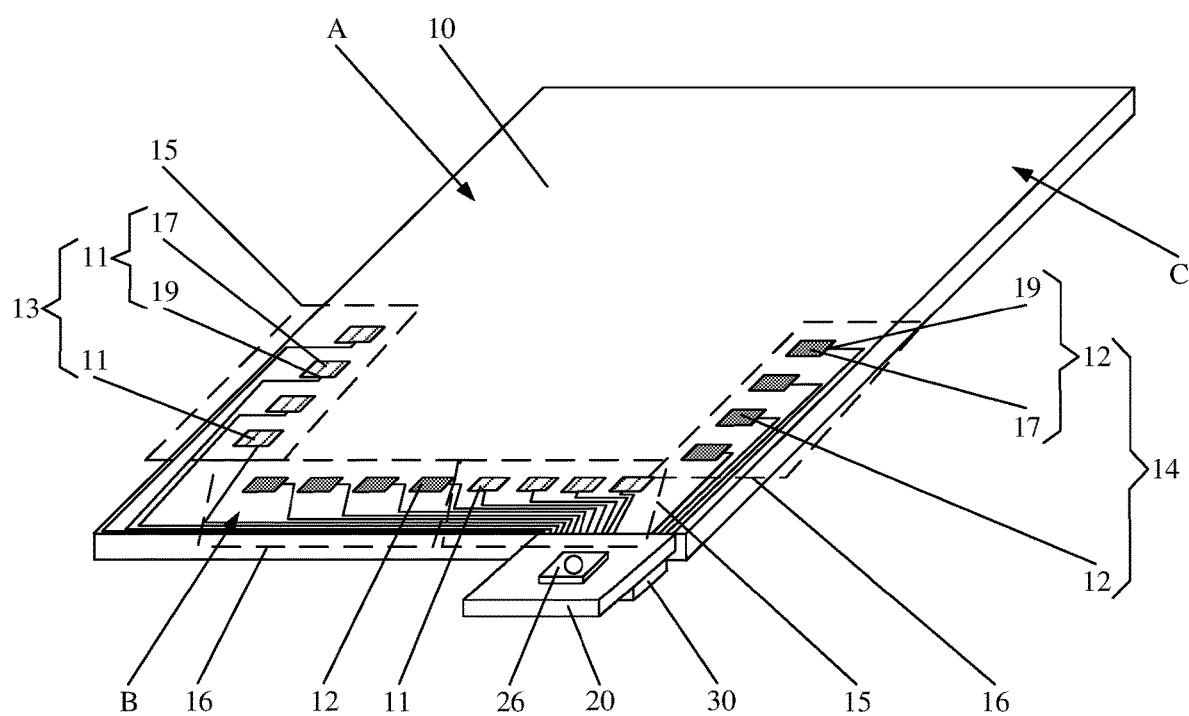
FIG. 8 is a schematic structural diagram of the display apparatus.

For example, as shown in FIG. 8, a plurality of first antenna elements 11 are arranged along the second direction in the first edge region A of the display screen 10 to form a first antenna element group 15. A plurality of first antenna elements 11 are arranged along the first direction in the second edge region B of the display screen 10 to form another first antenna element group 15. A plurality of second antenna elements 12 are arranged along the first direction in the second edge region B of the display screen 10 to form a second antenna element group 16. A plurality of second antenna elements 12 are arranged along the second direction in the third edge region C of the display screen 10 to form another second antenna element group 16. The second antenna element group 16 arranged in the second edge region B of the display screen 10 is near the first edge region A of the display screen 10 and located between two first antenna element groups 15 in the first direction. The first antenna element group 15 arranged in the second edge region B of the display screen 10 is near the third edge region C of the display screen 10 and located between two second antenna element groups 16 in the first direction. That is, the first antenna element group 15 and the second antenna element group 16 are arranged alternately in the first direction.

The above two antenna designs can also reduce mutual coupling between the antennas and can effectively reduce a degree of deterioration of the performance of the blocked antenna and expand a spatial coverage of beams, so as to improve the quality of wireless communication and user wireless experience.

In some embodiments of the present application, as shown in FIG. 2 to FIG. 8, the first antenna element 11 and the second antenna element 12 are arranged linearly. In this way, the antenna elements may be arranged as close to the edge of the display screen 10 as possible to prevent the influence on the touch, light emission and related optical properties of the display screen 10.

As shown in FIG. 2 to FIG. 6, when the first antenna elements 11 and the second antenna elements 12 are arranged alternately, a vertical distance between the first antenna elements 11 and the edge of the display screen 10 is the same as a vertical distance between the second antenna elements 12 and the same edge of the display screen 10. The first antenna elements 11 and the second antenna elements 12 disposed in the same edge are arranged in a straight line. The "vertical" in vertical distance means a direction perpendicular to an arrangement direction of the first antenna elements 11 or the second antenna elements 12 in a display surface of the display screen 10.

As shown in FIG. 7 to FIG. 8, when the first antenna element group 15 and the second antenna element group 16 are arranged alternately, a vertical distance between the first antenna elements 11 in the first antenna element group 15 and the edge of the display screen 10 is the same as a vertical distance between the second antenna elements 12 in the second antenna element group 16 and the same edge of the display screen 10. The first antenna elements 11 and the second antenna elements 12 disposed in one side are arranged in a line.

Figure 9:
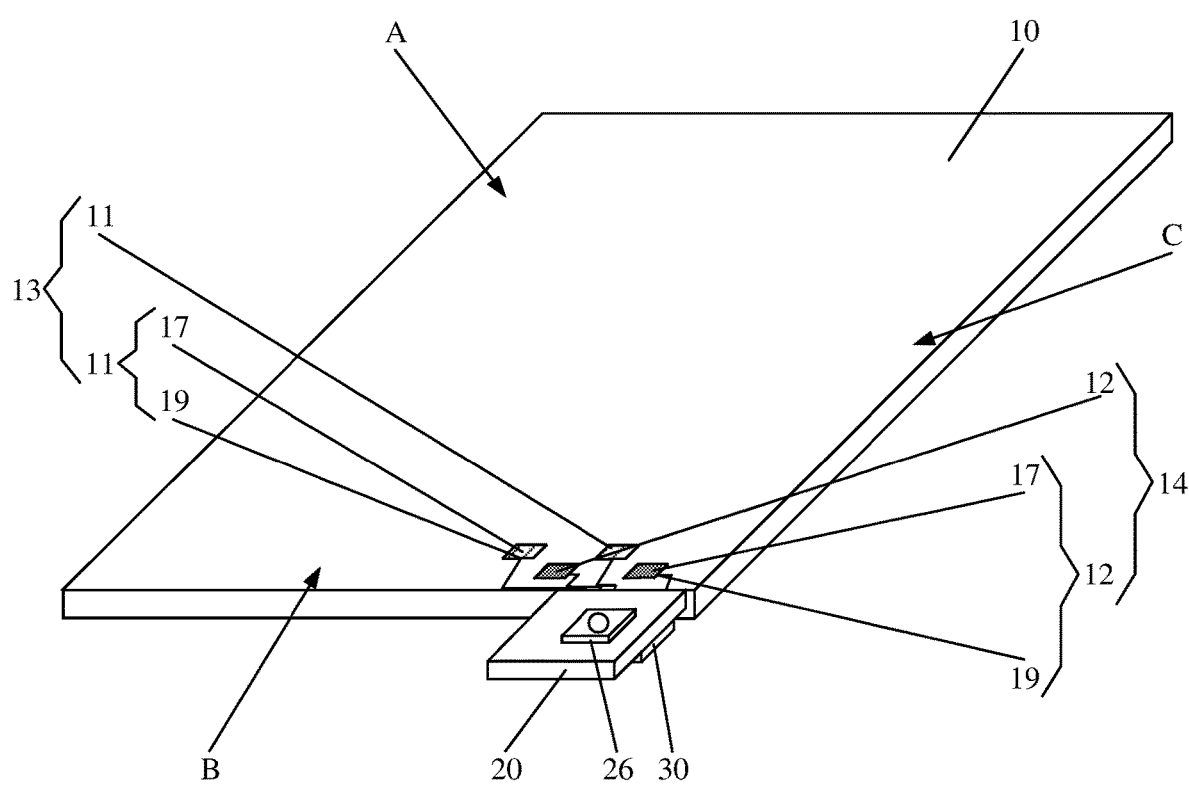
FIG. 9 is a schematic structural diagram of the display apparatus.

In some other embodiments of the present application, as shown in FIG. 9, the first antenna element 11 and the second antenna element 12 are arranged nonlinearly. In this way, spatial coverage of the beams of the antenna arrays and strength strengths of received signals may be further improved, and a degree of deterioration of the antenna performance caused by handholding or other blocking may be reduced.

As shown in FIG. 9, when the first antenna element 11 and the second antenna element 12 are arranged alternately, a vertical distance between a center of the first antenna element 11 and the edge of the display screen 10 is not the same as a vertical distance between a center of the second antenna element 12 and the edge of the display screen 10.

In the example shown in FIG. 9, the first antenna element 11 and the second antenna element 12 are alternately arranged in the first direction. The plurality of first antenna elements 11 are arranged in a straight line in the first direction, the plurality of second antenna elements 12 are arranged in a straight line in the first direction, and a straight line formed by connecting the centers of the plurality of first antenna elements 11 does not overlap with a straight line formed by connecting the centers of the plurality of second antenna elements 12.

When the first antenna element group 15 and the second antenna element group 16 are arranged alternately, a vertical distance between the center of the first antenna element 11 in the first antenna element group 15 and the edge of the display screen 10 is not the same as a vertical distance between the center of the second antenna element 12 in the second antenna element group 16 and the edge of the display screen 10. That is, the line connecting the centers of the first antenna elements 11 in the first antenna element group 15 does not overlap with the straight line connecting the centers of the second antenna elements 12 in the second antenna element group 16.

In some embodiments of the present application, as shown in FIG. 7 to FIG. 8, at least one of the first antenna element 11 and the second antenna element 12 is arranged in the first edge region A and the third edge region C of the display screen 10.

In one implementation of the present application, as shown in FIG. 7, the antenna elements arranged in the first edge region A of the display screen 10 are arranged opposite to the antenna elements arranged in the third edge region C of the display screen 10 one by one.

For example, as shown in FIG. 7, the antenna elements arranged in the first edge region A and the antenna elements arranged in the third edge region C are second antenna elements 12, and the second antenna elements 12 arranged in the first edge region A of the display screen 10 are arranged in an alignment with the second antenna elements 12 arranged in the third edge region C of the display screen 10 one by one.

In another example, the antenna elements arranged in the first edge region A and the antenna elements arranged in the third edge region C are first antenna elements 11, and the first antenna elements 11 arranged in the first edge region A of the display screen 10 are arranged in an alignment with the first antenna elements 11 arranged in the third edge region C of the display screen 10 one by one.

In yet another example, the antenna elements arranged in the first edge region A are the first antenna elements 11 and the antenna elements arranged in the third edge region C are second antenna elements 12, and the first antenna elements 11 arranged in the first edge region A of the display screen 10 are arranged in an alignment with the second antenna elements 12 arranged in the third edge region C of the display screen 10 one by one.

In still another example, the antenna elements arranged in the first edge region A and the antenna elements arranged in the third edge region C include first antenna elements 11 and second antenna elements 12, and the first antenna elements 11 arranged in the first edge region A of the display screen 10 are arranged in an alignment with the first antenna elements 11 or the second antenna elements 12 arranged in the third edge region C of the display screen 10 one by one; the second antenna elements 12 arranged in the first edge region A of the display screen 10 are arranged in an alignment with the first antenna elements 11 or the second antenna elements 12 arranged in the third edge region C of the display screen 10 one by one.

Figure 10:
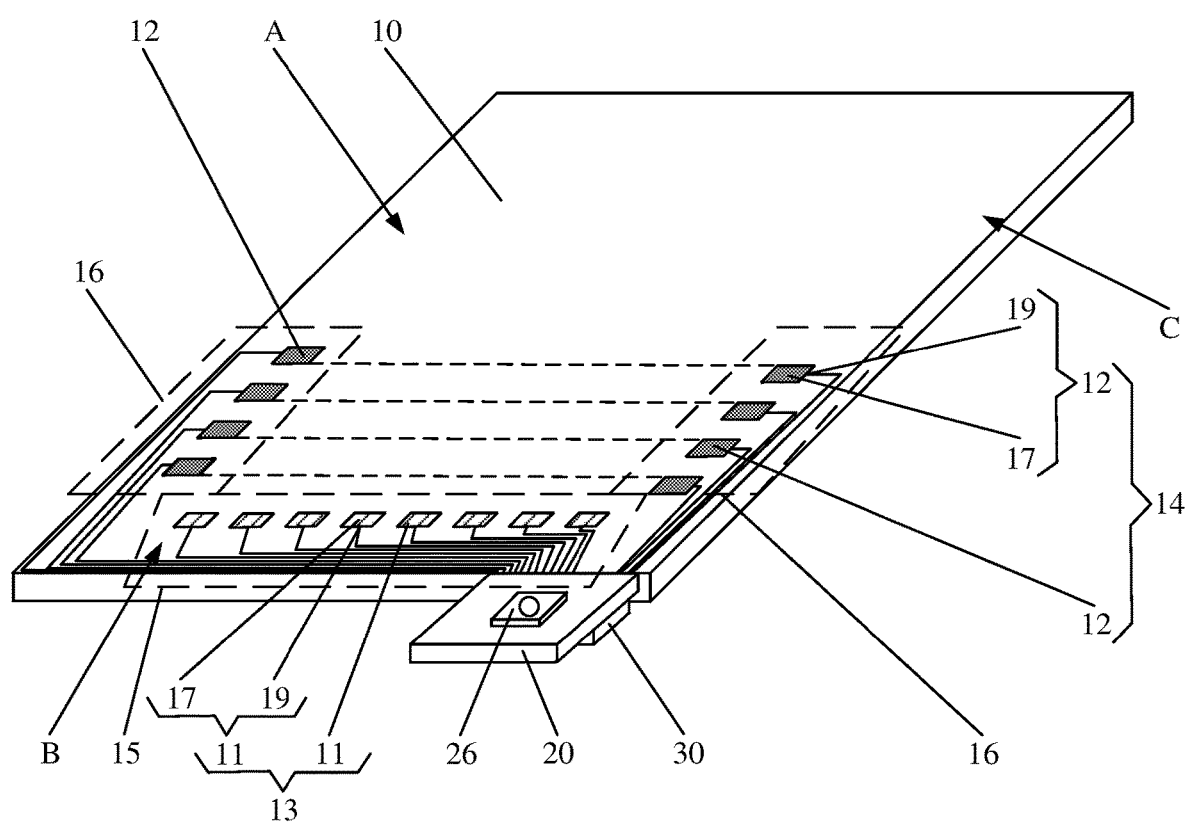
FIG. 10 is a schematic structural diagram of the display apparatus.

In another implementation of the present application, as shown in FIG. 10, the antenna elements arranged in the first edge region A of the display screen 10 are misaligned with the antenna elements arranged in the third edge region C of the display screen 10. In this way, mutual coupling between the antenna elements arranged in the first edge region A and the antenna elements arranged in the third edge region C may be reduced, a degree of deterioration of the performance of the blocked antenna may be effectively reduced, and spatial coverage of beams may be expanded, so as to improve the quality of wireless communication and user wireless experience.

For example, as shown in FIG. 10, the antenna elements arranged in the first edge region A and the antenna elements arranged in the third edge region C are second antenna elements 12, and the second antenna elements 12 arranged in the first edge region A of the display screen 10 are misaligned with the second antenna elements 12 arranged in the third edge region C of the display screen 10.

In another example, the antenna elements arranged in the first edge region A and the antenna elements arranged in the third edge region C are first antenna elements 11, and the first antenna elements 11 arranged in the first edge region A of the display screen 10 are misaligned with the first antenna elements 11 arranged in the third edge region C of the display screen 10.

In yet another example, the antenna elements arranged in the first edge region A are first antenna elements 11 and the antenna elements arranged in the third edge region C are second antenna elements 12, and the first antenna elements 11 arranged in the first edge region A of the display screen 10 are misaligned with the second antenna elements 12 arranged in the third edge region C of the display screen 10.

In still another example, the antenna elements arranged in the first edge region A and the antenna elements arranged in the third edge region C both include first antenna elements 11 and second antenna elements 12, and the first antenna elements 11 arranged in the first edge region A of the display screen 10 are misaligned with the first antenna elements 11 or the second antenna elements 12 arranged in the third edge region C of the display screen 10; the second antenna elements 12 arranged in the first edge region A of the display screen 10 are misaligned with the first antenna elements 11 or the second antenna elements 12 arranged in the third edge region C of the display screen 10.

Figure 11:
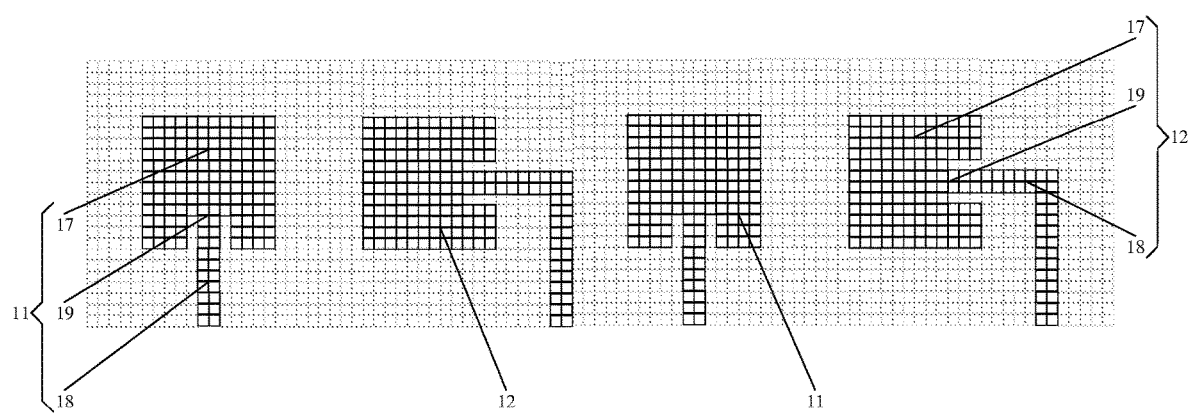
FIG. 11 is a schematic structural diagram of a first antenna element and a second antenna element.

In some embodiments of the present application, as shown in FIG. 11, each of the first antenna elements 11 and the second antenna elements 12 includes a radiation portion 17 and a feed portion 18, and the radiation portion 17 is provided with a feed point 19.

The radiation portion 17 is configured to receive and transmit wireless signals, the feed portion 18 is configured to transmit wired signals, and the feed point 19 is connection point between the radiation portion 17 and the feed portion 18.

For example, as shown in FIG. 11, the radiation portion 17 has a substantially rectangular shape, and the feed portion 18 is in a shape of a strip and vertically connected to the feed point 19 of the radiation portion 17.

In practical applications, as shown in FIG. 11, when an orthographic projection area of the radiation portion 17 on a substrate of the display screen 10 is in the shape of a square, the square is provided with a notch at the feed point 19 to benefit impedance matching and improve antenna performance. That is, two sides of a junction between the feed portion 18 and the corresponding radiation portion 17 are recessed in the radiation portion of the antenna element. For example, as shown in FIG. 11, the side edges of the rectangular radiation body connected to the strip-shaped feed portion have notches, and the notches are arranged adjacent to the strip-shaped feed portion on both sides of the strip-shaped feed portion.

In some embodiments of the present application, as shown in FIG. 2 to FIG. 11, a side on which the feed point 19 on the radiation portion 17 of the first antenna element 11 is located is not parallel to a side on which the feed point 19 on the radiation portion 17 of the second antenna element 12 is located, so that the polarization direction of the first antenna element 11 is different from the polarization direction of the second antenna element 12.

For example, as shown in FIG. 2 to FIG. 11, the side on which the feed point 19 on the radiation portion 17 of the first antenna element 11 is located is perpendicular to the side on which the feed point 19 on the radiation portion 17 of the second antenna element 12 is located, so that the polarization direction of the first antenna element 11 is orthogonal to the polarization direction of the second antenna element 12.

In some embodiments of the present application, as shown in FIG. 2 to FIG. 11, an orthographic projection of the radiation portion 17 of the first antenna element 11 on the substrate of the display screen 10 and an orthographic projection of the radiation portion 17 of the second antenna element 12 on the substrate of the display screen 10 are polygons with a same shape.

For example, as shown in FIG. 2 to FIG. 11, the orthographic projection of the radiation portion 17 of the first antenna element 11 on the substrate of the display screen 10 and the orthographic projection of the radiation portion 17 of the second antenna element 12 on the substrate of the display screen 10 are in the shape of squares. An orthographic projection of the feed point 19 of the first antenna element 11 on the substrate of the display screen 10 is located in a center of a first side of the square, an orthographic projection of the feed point 19 of the second antenna element 12 on the substrate of the display screen 10 is located in a center of a second side of the square, and the first side is not parallel to the second side, so that the polarization direction of the first antenna element 11 is different from the polarization direction of the second antenna element 12.

In other embodiments, the orthographic projections of the radiation portion 17 of the first antenna element 11 and the radiation portion 17 of the second antenna element 12 on the substrate of the display screen 10 may also be in the shape of diamonds, circles, and so on.

In some other embodiments of the present application, the orthographic projection of the radiation portion 17 of the first antenna element 11 on the substrate of the display screen 10 and the orthographic projection of the radiation portion 17 of the second antenna element 12 on the substrate of the display screen 10 are in different shapes.

For example, the orthographic projection of the radiation portion 17 of the first antenna element 11 on the substrate of the display screen 10 is in the shape of a rectangle, and the orthographic projection of the radiation portion 17 of the second antenna element 12 on the substrate of the display screen 10 is in the shape of a diamond.

Figure 12:
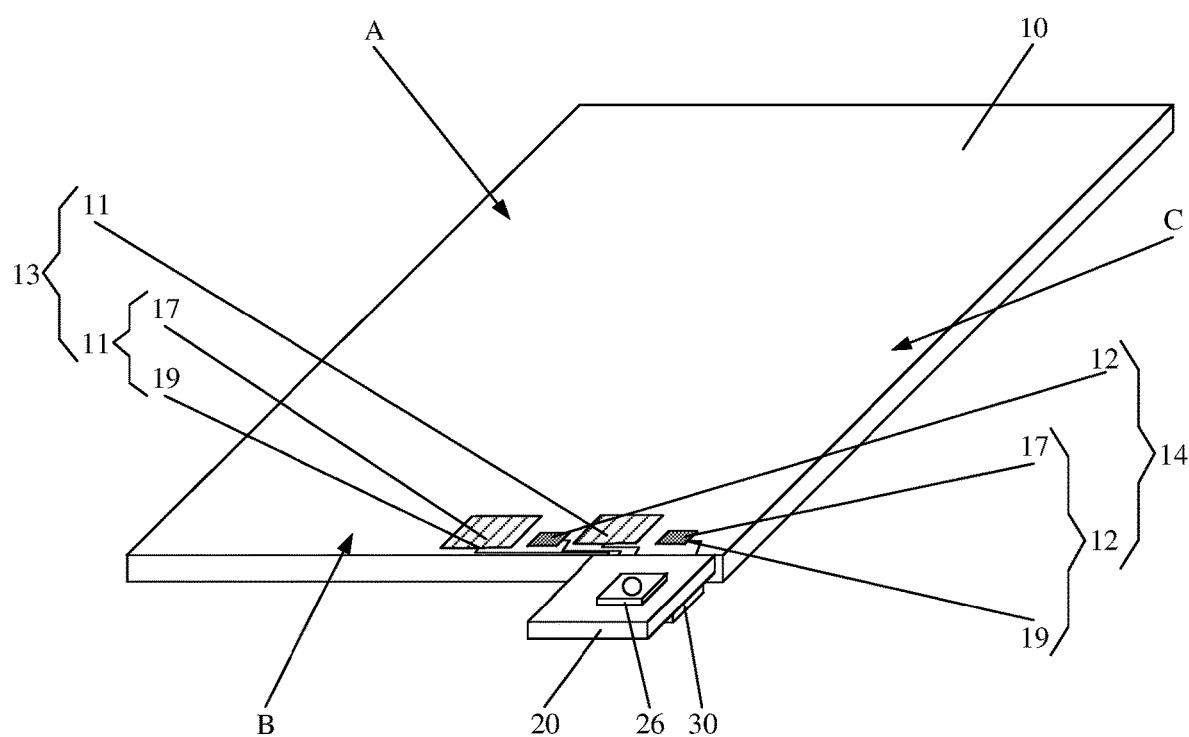
FIG. 12 is a schematic structural diagram of the display apparatus.

In some embodiments of the present application, as shown in FIG. 12, an orthographic projection area of the radiation portion 17 of the first antenna element 11 on the substrate of the display screen 10 is different from an orthographic projection area of the radiation portion 17 of the second antenna element 12 on the substrate of the display screen 10. In this way, the first antenna element 11 and the second antenna element 12 may receive and transmit RF signals in different frequency bands, which increase frequency ranges covered by the antennas, further reduces the communication dead zones and enhances the roaming capability of the frequency bands, so as to improve the quality of wireless communication and user wireless experience. For example, the operating frequency range of the first antenna element 11 is from 24.25 GHz to 29.50 GHz, and the operating frequency range of the second antenna element 12 is from 37.0 GHz to 43.5 GHz.

Specifically, the orthographic projection area of the radiation portion 17 of the first antenna element 11 on the substrate of the display screen 10 may be larger than the orthographic projection of the radiation portion 17 of the second antenna element 12 on the substrate of the display screen 10 (as shown in FIG. 12) or smaller than the orthographic projection of the radiation portion 17 of the second antenna element 12 on the substrate of the display screen 10.

Figure 13:
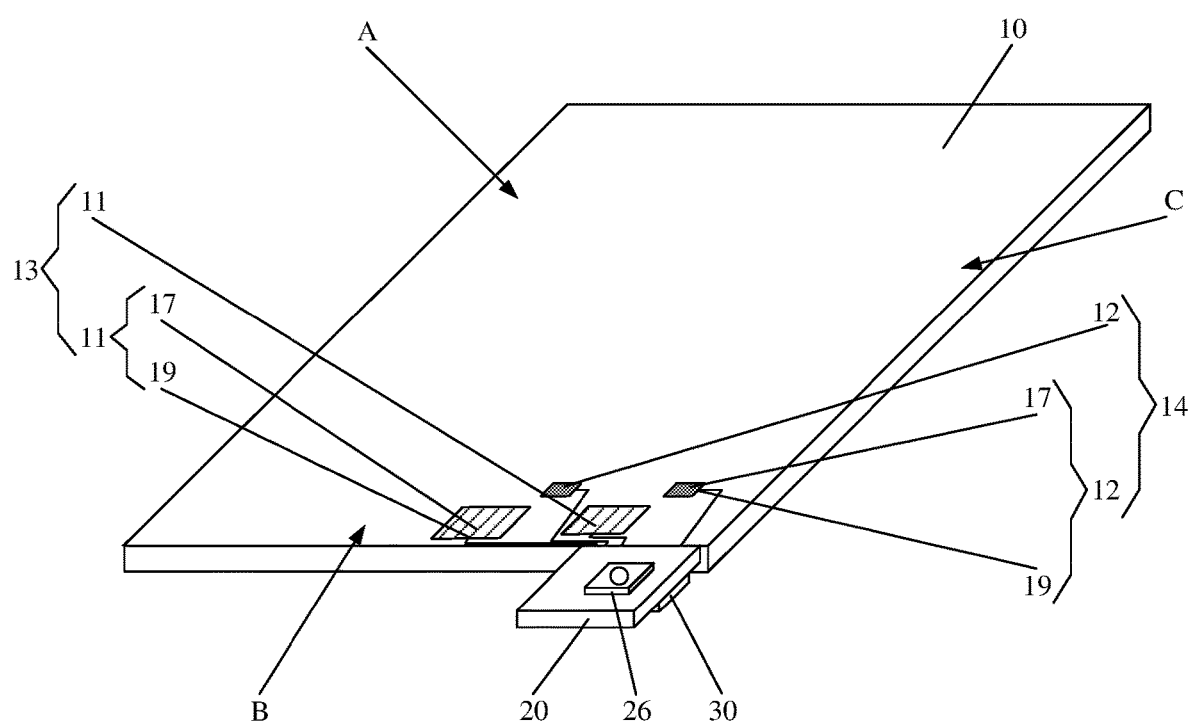
FIG. 13 is a schematic structural diagram of the display apparatus.

Further, as shown in FIG. 13, the first antenna element 11 and the second antenna element 12 are arranged nonlinearly. The combination of the nonlinear arrangement with different orthographic projection areas on the substrate of the display screen 10 may reduce a degree of mutual coupling between the antennas and reduce a degree of deterioration of the antenna performance caused by blocking, so the quality of wireless communication and user wireless experience can be improved.

For example, as shown in FIG. 13, the orthographic projection area of the radiation portion 17 of the first antenna element 11 on the substrate of the display screen 10 is larger than the orthographic projection area of the radiation portion 17 of the second antenna element 12 on the substrate of the display screen 10, and the vertical distance between the center of the first antenna element 11 and the edge of the display screen 10 is less than the vertical distance between the center of the second antenna element 12 and the edge of the display screen 10.

In some embodiments of the present application, as shown in FIG. 2 to FIG. 11, orthographic projection areas of the radiation portions 17 of the first antenna elements 11 on the substrate of the display screen 10 are the same, and orthographic projection areas of the radiation portions 17 of the second antenna elements 12 on the substrate of the display screen 10 are the same.

Figure 14:
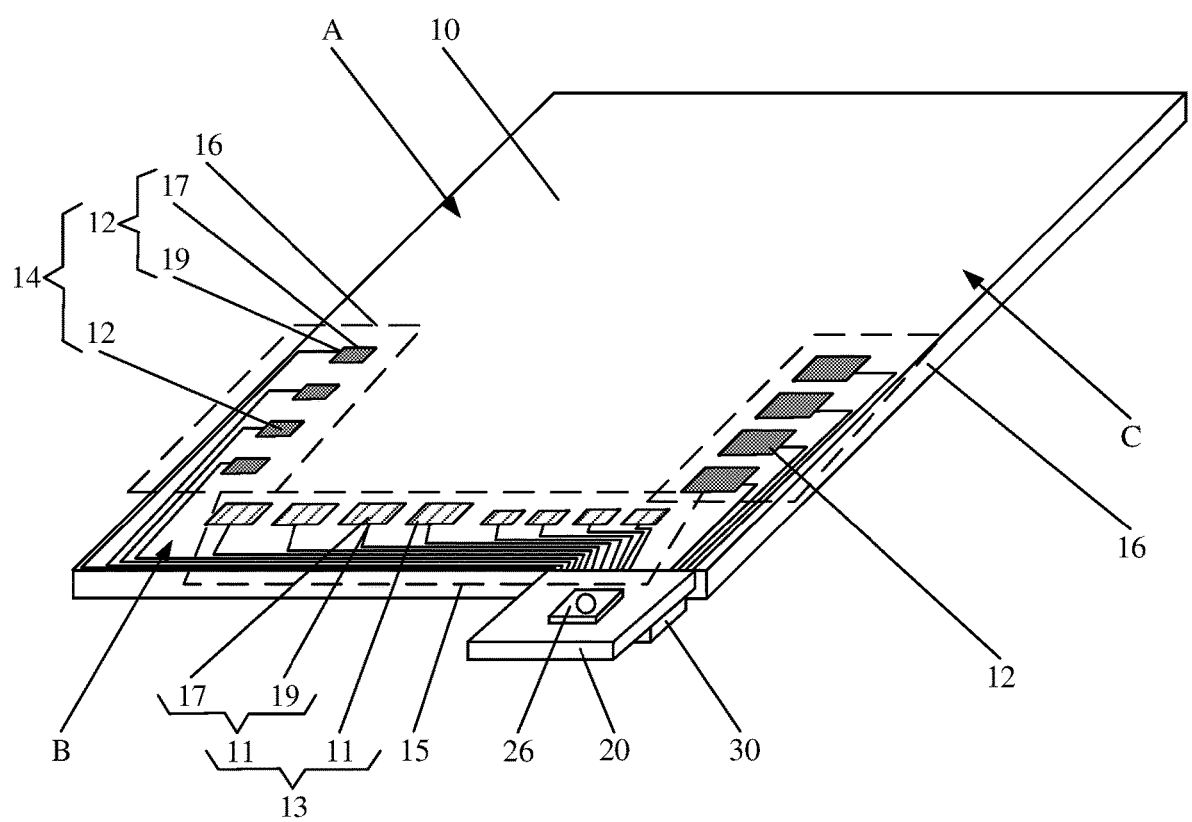
FIG. 14 is a schematic structural diagram of the display apparatus.

In some other embodiments of the present application, as shown in FIG. 14, the orthographic projection areas of the radiation portions 17 of the first antenna elements 11 on the substrate of the display screen 10 are different, and the orthographic projection areas of the radiation portions 17 of the second antenna elements 12 on the substrate of the display screen 10 are different.

In one implementation of the present application, the orthographic projection areas of the radiation portions 17 of the first antenna elements 11 in a same first antenna element group 15 on the substrate of the display screen 10 are different, and the orthographic projection areas of the radiation portions 17 of the second antenna elements 12 in a same second antenna element group 16 on the substrate of the display screen 10 are different.

For example, as shown in FIG. 14, eight first antenna elements 11 are arranged along the first direction in the second edge region B of the display screen 10 to form a first antenna element group 15. Orthographic projection areas of the radiation portions 17 of the four first antenna elements 11 near the first edge region A of the display screen 10 on the substrate of the display screen 10 are larger than orthographic projection areas of the radiation portions 17 of the four first antenna elements 11 near the third edge region C of the display screen 10 on the substrate of the display screen 10, and thus the operating frequency band of each of the four first antenna elements 11 near the first edge region A of the display screen 10 is lower than the operating frequency band of each of the four first antenna elements 11 near the third edge region C of the display screen 10.

In addition, four second antenna elements 12 are arranged along the second direction in the first edge region A of the display screen 10 to form a second antenna element group 16. Four second antenna elements 12 are arranged along the second direction in the third edge region C of the display screen 10 to form another second antenna element group 16. Orthographic projection areas of the radiation portions 17 of the four second antenna elements 12 arranged in the first edge region A of the display screen 10 on the substrate of the display screen 10 are smaller than orthographic projection areas of the radiation portions 17 of the four second antenna elements 12 arranged in the third edge region C of the display screen 10 on the substrate of the display screen 10, and thus the operating frequency band of each of the four second antenna elements 12 arranged in the first edge region A of the display screen 10 is higher than the operating frequency band of each of the four second antenna elements 12 arranged in the third edge region C of the display screen 10. In this case, the operating frequency bands of the antenna elements are staggered in high and low ranges, which may further reduce mutual coupling between the antennas and may effectively reduce a degree of deterioration of the performance of the blocked antenna and expand spatial coverage of beams, so as to improve the quality of wireless communication and user wireless experience.

Figure 15:
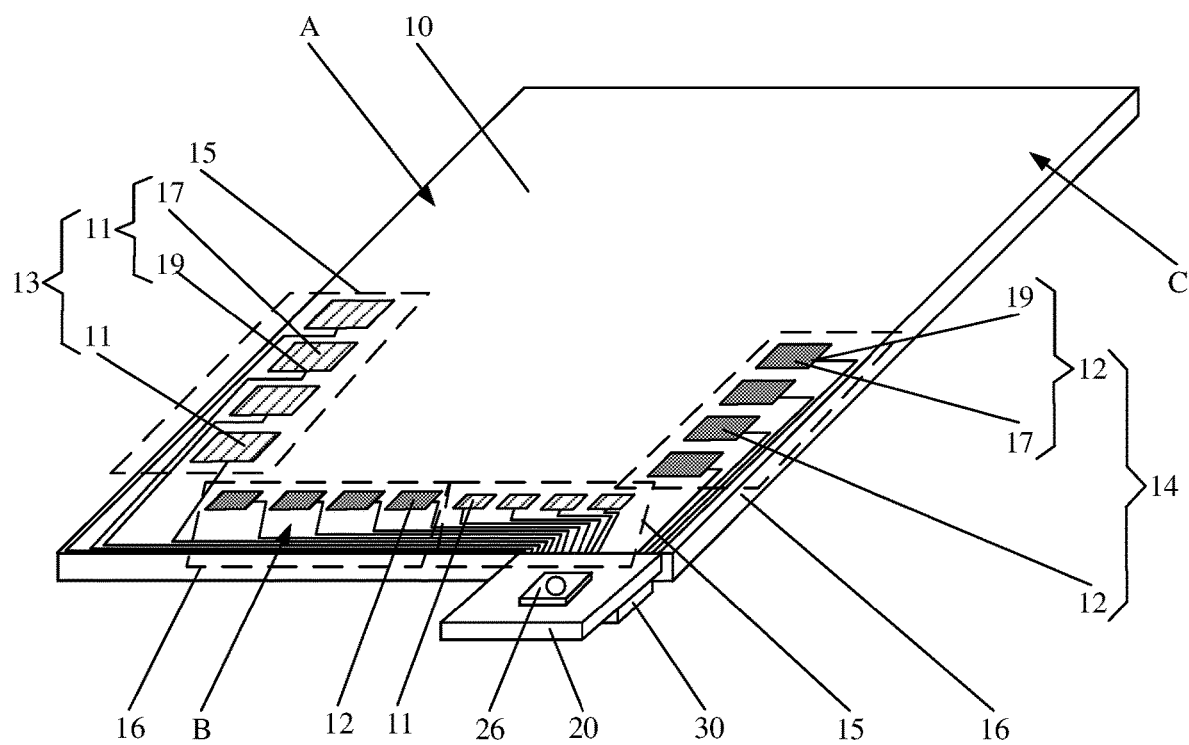
FIG. 15 is a schematic structural diagram of the display apparatus.

In another implementation of the present application, as shown in FIG. 15, the orthographic projection areas of the radiation portions 17 of the first antenna elements 11 in at least two of the first antenna element groups 15 on the substrate of the display screen 10 are different, and the orthographic projection areas of the radiation portions 17 of the second antenna elements 12 in at least two of the second antenna element groups 16 on the substrate of the display screen 10 are different.

For example, as shown in FIG. 15, four first antenna elements 11 are arranged along the second direction in the first edge region A of the display screen 10 to form a first antenna element group 15. Four first antenna elements 11 are arranged along the second direction in the second edge region B of the display screen 10 to form another first antenna element group 15. Orthographic projection areas of the radiation portions 17 of the first antenna elements 11 in the first antenna element group 15 arranged in the first edge region A of the display screen 10 on the substrate of the display screen 10 are larger than orthographic projection areas of the radiation portions 17 of the first antenna elements 11 in the first antenna element group 15 arranged in the second edge region B of the display screen 10 on the substrate of the display screen 10, and thus the operating frequency band of the first antenna element group 15 arranged in the first edge region A of the display screen 10 is lower than the operating frequency band of the first antenna element group 15 arranged in the second edge region B of the display screen 10.

Four second antenna elements 12 are arranged along the first direction in the second edge region B of the display screen 10 to form a second antenna element group 16. Four second antenna elements 12 are arranged along the second direction in the third edge region C of the display screen 10 to form another second antenna element group 16. Orthographic projection areas of the radiation portions 17 of the four second antenna elements 12 in the second antenna element group 16 arranged in the second edge region B of the display screen 10 on the substrate of the display screen 10 are smaller than orthographic projection areas of the radiation portions 17 of the four second antenna elements 12 in the second antenna element group 16 arranged in the third edge region C of the display screen 10 on the substrate of the display screen 10, and thus the operating frequency band of the second antenna element group 16 arranged in the second edge region B of the display screen 10 is lower than the operating frequency band of the second antenna element group 16 arranged in the third edge region C of the display screen 10. In this case, the antenna element groups near the second edge region B of the display screen 10 are all of high frequency bands, and the antenna element groups away from the second edge region B of the display screen 10 are all of low frequency bands, which can effectively reduce a degree of deterioration of the performance of the blocked antenna and expand spatial range coverage of beams, so as to improve the quality of wireless communication and user wireless experience.

In addition, orthographic projection areas of the radiation portions 17 of the first antenna elements 11 in the first antenna element group 15 arranged in the first edge region A of the display screen 10 on the substrate of the display screen 10 are larger than orthographic projection areas of the radiation portions 17 of the second antenna elements 12 in the second antenna element group 16 arranged in the third edge region C of the display screen 10 on the substrate of the display screen 10, and thus the operating frequency band of the first antenna element group 15 arranged in the first edge region A of the display screen 10 is lower than the operating frequency band of the second antenna element group 16 arranged in the third edge region C of the display screen 10. Orthographic projection areas of the radiation portions 17 of the second antenna elements 12 in the second antenna element group 16 arranged in the second edge region B of the display screen 10 on the substrate of the display screen 10 are larger than orthographic projection areas of the radiation portions 17 of the first antenna elements 11 in the first antenna element group 15 arranged in the second edge region B of the display screen 10 on the substrate of the display screen 10, and thus the operating frequency band of the second antenna element group 16 arranged in the second edge region B of the display screen 10 is lower than the operating frequency band of the first antenna element group 15 arranged in the second edge region B of the display screen 10. In this case, the operating frequency band of the antenna element group near the first edge region A of the display screen 10 is lower than the operating frequency band of the antenna element group near the third edge region C of the display screen 10, which can effectively reduce a degree of deterioration of the performance of the blocked antenna and expand spatial range coverage of beams, so as to improve the quality of wireless communication and user wireless experience.

In some embodiments of the present application, distances between the antenna elements are the same. Exemplarily, the distance between the antenna elements refers to a distance of a space between two adjacent antenna elements; alternatively, the distance between antenna elements may also refer to a distance between the centers of two adjacent antenna elements.

Two adjacent antenna elements may be a first antenna element 11 and a second antenna element 12 arranged adjacent to each other, or two first antenna elements 11 arranged adjacent to each other, or two second antenna elements 12 arranged adjacent to each other.

In some other embodiments of the present application, the antenna elements are spaced apart by different distances, so different beam widths may be radiated to achieve the designs for different spatial coverage, which can improve the design freedom and further improve the quality of wireless communication and the user wireless experience.

For example, the plurality of antenna elements include a first antenna element 11, a second antenna element 12, a first antenna element 11 and a second antenna element 12 sequentially arranged. If it is defined that the first one of the first antenna elements 11 and the first one of the second antenna elements 12 are spaced apart by a distances of "a", the first one of the second antenna elements 12 and the second one of the first antenna elements 11 are spaced apart by a distance of "b" and the second one of the first antenna elements 11 and the second one of the second antenna elements 12 are spaced apart by a distance of "c", the following situations may be included.

Figure 16:
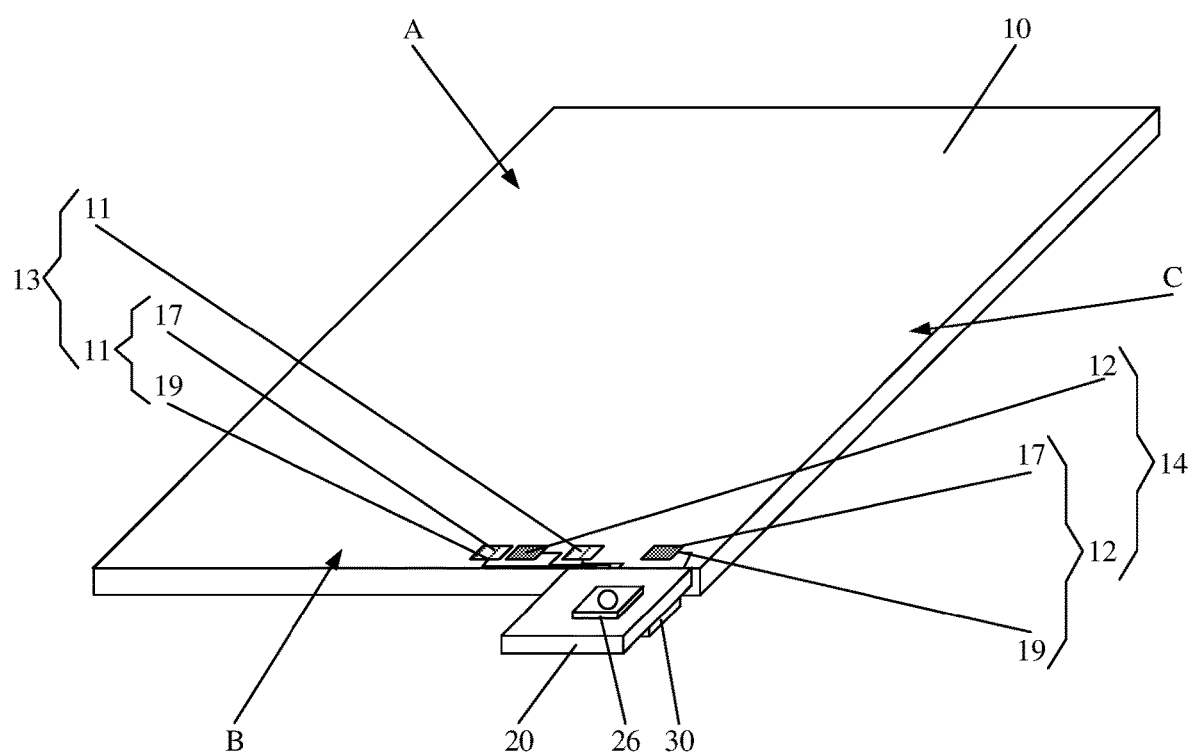
FIG. 16 is a schematic structural diagram of the display apparatus.

In the first situation, a≠b, a≠c and b≠c. As shown in FIG. 16, a<b<c.

Figure 17:
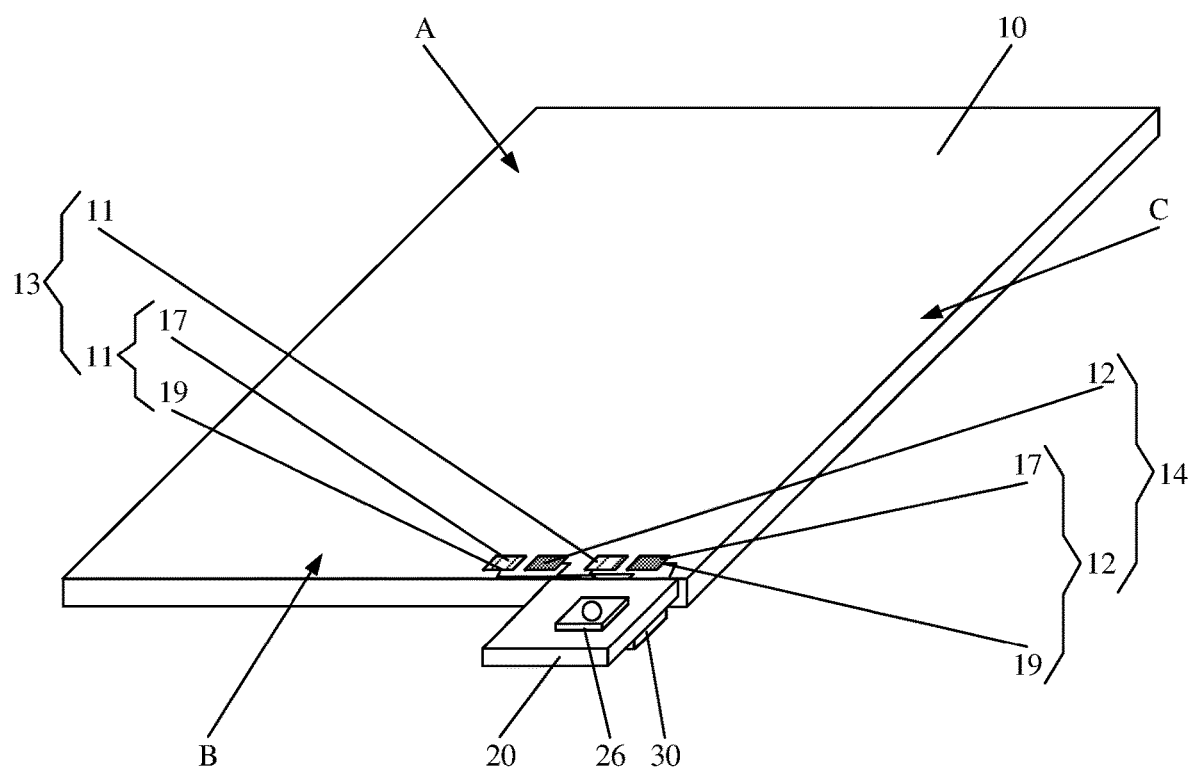
FIG. 17 is a schematic structural diagram of the display apparatus.

In the second situation, a≠b and a=c. As shown in FIG. 17, a=c<b.

Figure 18:
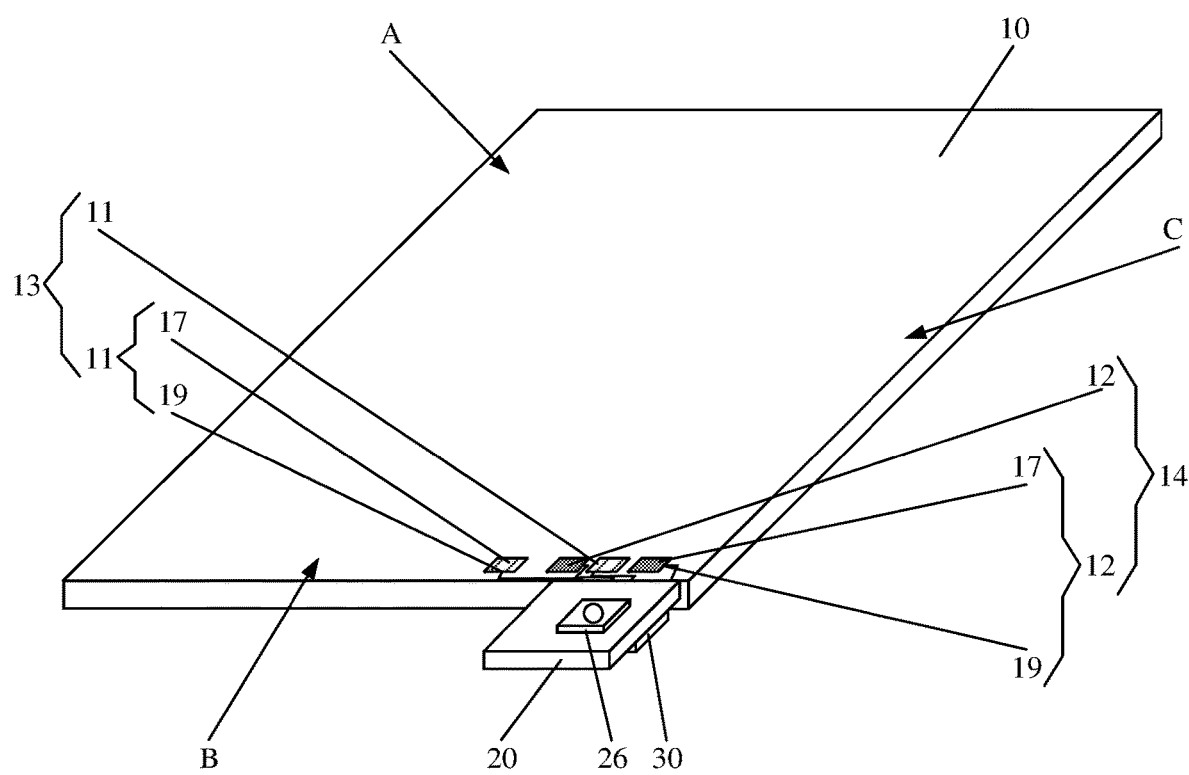
FIG. 18 is a schematic structural diagram of the display apparatus.

In the third situation, a≠b and b=c. As shown in FIG. 18, a>b=c.

Figure 19:
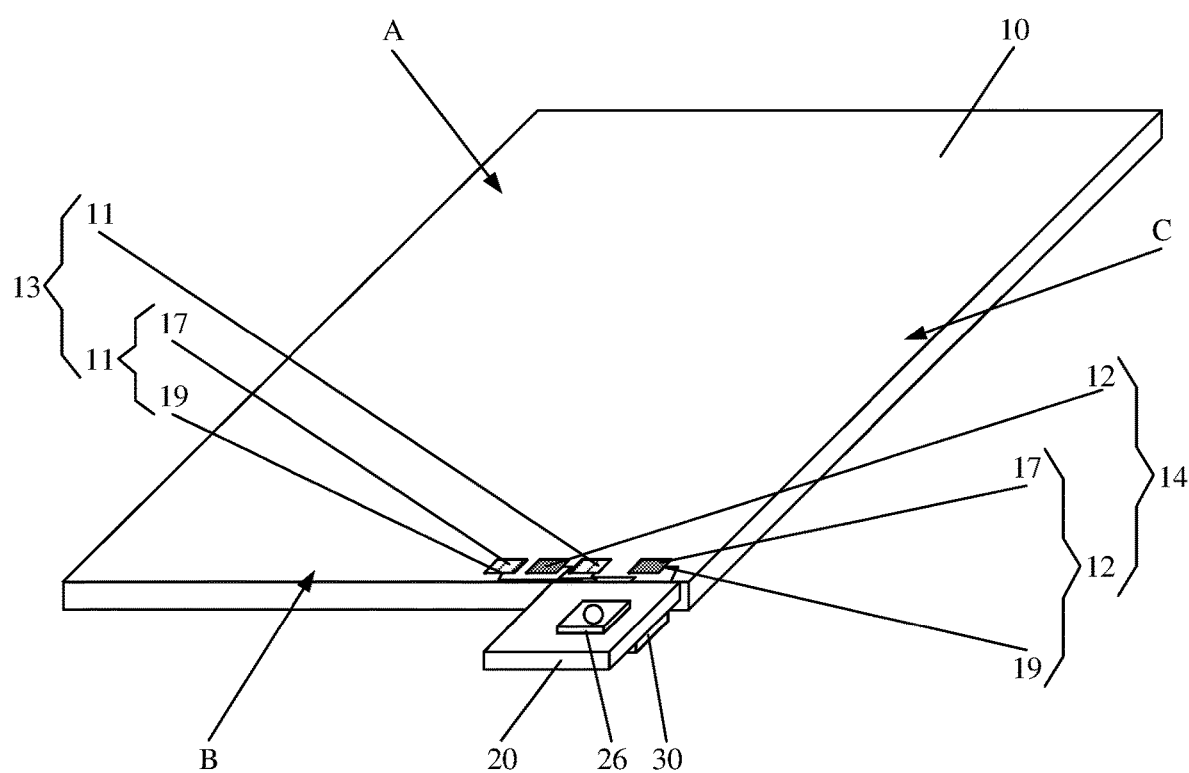
FIG. 19 is a schematic structural diagram of the display apparatus.

In the fourth situation, a=b and a≠c. As shown in FIG. 19, a=b<c.

In some embodiments of the present application, as shown in FIG. 11, the display screen 10 includes a display panel and a touch panel, the display panel includes a conductive mesh layer, and the first antenna element 11 and the second antenna element 12 are formed by at least part of a pattern in the conductive mesh layer. In this way, on the one hand, power can be conducted to realize signal transmission, and on the other hand, the display screen 10 can display images via meshes. In some embodiments, the conductive mesh layer is a touch layer of the display screen 10, and the first antenna elements 11 and the second antenna elements 12 are formed by at least part of pattern in the touch layer.

In practical applications, the display panel requires a high manufacturing process and fine internal electronic functions, so internal structure changes easily cause adverse effects on the display panel. Therefore, the antenna integrated to the display screen is generally arranged outside the display panel, such as in the touch panel. In the above embodiment, the first antenna element 11 and the second antenna element 12 are arranged in the display panel, which overcomes common technical prejudice and makes creative contributions via the advancement of process and design (for example, stricter process control enables the optical effect of the display screen to be maintained high, and more delicate design, layout and stacking ensure the original performance of the display screen to be maintained to the maximum extent and ensure the antenna performance to be better guaranteed, and mutual interference between the antennas and other electronic functions in the display screen can be mitigated, etc.).

Specifically, the antennas may be manufactured by cutting conductive meshes in the conductive mesh layer. That is, an antenna mesh is disconnected from (namely, non-electrically connected to) a non-antenna mesh. Specifically, the conductive meshes around each first antenna element 11 are disconnected to form the first antenna element 11; and the conductive meshes around each second antenna element 12 are disconnected to form the second antenna element 12.

Specifically, the display panel may include at least one of a substrate, an array layer, a display layer and a packaging layer. The array layer and the display layer are successively arranged on the substrate, the packaging layer at least covers the display layer externally, and the touch panel or a cover plate is arranged on the packaging layer. The conductive mesh layer may be an existing metal layer of the display panel, so as to reduce additional processes and costs (such as positioning, attachment, etc.) required when the conductive mesh layer is arranged outside the display screen, and also improve the positioning accuracy and robustness of the conductive mesh layer. That is, it is beneficial to the consistency and stability of the antenna performance, a total thickness of the product may also be reduced, and the user experience and the product competitiveness are further improved. In addition, the conductive mesh layer may also be an additional metal layer in the display panel. In this case, in addition to the above beneficial effects based on the existing metal layer in the display screen, the performance of the antennas may be improved, and the sacrifice, compromise or deterioration of the functions in the display screen may be reduced, so the user experience and the product competitiveness may also be improved.

In other embodiments, the touch panel may be embedded in the display panel. In this case, a touch layer is arranged between the display layer and the packaging layer, and the conductive mesh layer may be arranged in a same layer with the touch layer.

Specifically, each first antenna element 11 and each second antenna element 12 are arranged in a same layer. In this case, the display screen has a reduced thickness and better antenna performance, and first antenna element 11 and the second antenna element 12 may not affect other functions (such as touch control or display) of the display screen. Conversely, if the first antenna element 11 and the second antenna element 12 are located in different layers, the display screen has a thickened size and poor antenna performance, and first antenna element 11 and the second antenna element 12 may also adversely affect other functions in the screen.

Based on the same invention concept, an embodiment of the present application further provides a display apparatus. As shown in FIG. 2 to FIG. 19, the display apparatus includes the display screen 10 in the above embodiment, a Flexible Printed Circuit (FPC) 20 and an RFIC 30. The FPC 20 is electrically connected to the display screen 10, and the RFIC 30 is arranged on the FPC 20. The RFIC 30 is electrically connected to or electrically coupled to the first antenna element 11 and the second antenna element 12 respectively.

In the display apparatus, the first antenna element and the second antenna element are connected to a same RFIC, which is conducive to realizing an MIMO operation based on lower costs and smaller space, thereby upgrading a data transmission rate and enhancing the quality of communication, user wireless experience and comprehensive product competitiveness again.

Figure 20:
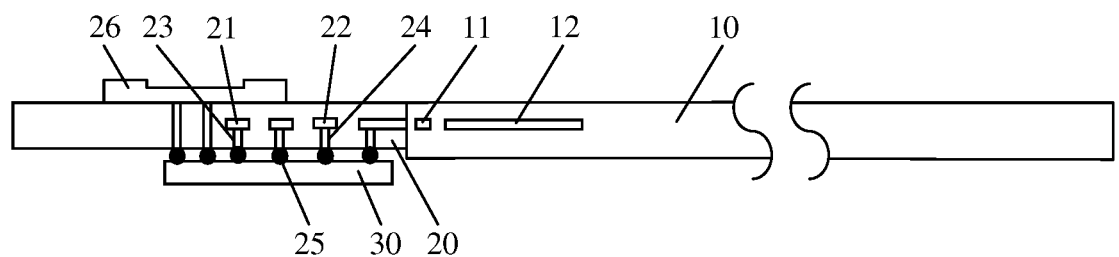
FIG. 20 is a schematic cross-sectional view taken along a sectional line X-X in FIG. 2.

In some embodiments of the present application, as shown in FIG. 20, the FPC 20 is provided with a first RF signal line 21 correspondingly connected to the first antenna element, and the first antenna element is electrically connected to the RFIC 30 via the corresponding first RF signal line 21. The FPC 20 is provided with a second RF signal line 22 correspondingly connected to the second antenna element, and the second antenna element is electrically connected to the RFIC 30 via the corresponding second RF signal line 22. In this way, the RFIC 30 can be easily arranged without being attached to the display screen 10.

Specifically, when the first antenna element and the second antenna element are configured as millimeter-wave antennas, the RFIC 30 is a millimeter-wave RFIC. When the first antenna element and the second antenna element are configured as non-millimeter-wave antennas, the RFIC 30 is a non-millimeter-wave RFIC.

For example, as shown in FIG. 20, the FPC 20 is provided with a first via hole 23 correspondingly communicated with the first RF signal line 21, and the first RF signal line 21 is electrically connected to the RFIC 30 via the corresponding first via hole 23. The FPC 20 is provided with a second via hole 24 correspondingly connected with the second RF signal line 22, and the second RF signal line 22 is electrically connected to the RFIC 30 via the corresponding second via hole 24. In this way, the first RF signal line 21 and the second RF signal line 22 are arranged in the FPC 20, and a metal layer of the FPC 20 may be used to protect the first RF signal line 21 and the second RF signal line 22 and prevent interference.

For example, as shown in FIG. 20, the RFIC 30 is electrically connected to the first RF signal line 21 via a conductor 25 located in the first via hole 23, the RFIC 30 is electrically connected to the second RF signal line 22 via the conductor 25 located in the second via hole 24, and the RFIC 30 is fixed to the FPC 20 by using the conductor 25 and forms an electrical connection.

Optionally, the conductor 25 is a solder ball or solder pad.

In some embodiments of the present application, as shown in FIG. 20, the FPC 20 is provided with a first connecting base 26. The first connecting base 26 is configured to be electrically connected to a system motherboard.

For example, as shown in FIG. 20, the first connecting base 26 and the RFIC 30 are located on two opposite sides of the FPC 20. In other embodiments, the first connecting base 26 and the RFIC 30 may also be located on a same side of the FPC 20.

Specifically, the first connecting base 26 is electrically connected to the RFIC 30 via the conductor 25 located above the first via hole 23.

In practical applications, as shown in FIG. 20, the first RF signal line 21, the second RF signal line 22, the first antenna element 11 and the second antenna element 12 all have a certain thickness. The first RF signal line 21 is electrically connected to the feed portion in the first antenna element, and the thickness of the first RF signal line 21 may be the same as or different from the thickness of the first antenna element. The second RF signal line 22 is electrically connected to the feed portion in the second antenna element, and the thickness of the second RF signal line 22 may be the same as or different from the thickness of the second antenna element.

Figure 21:
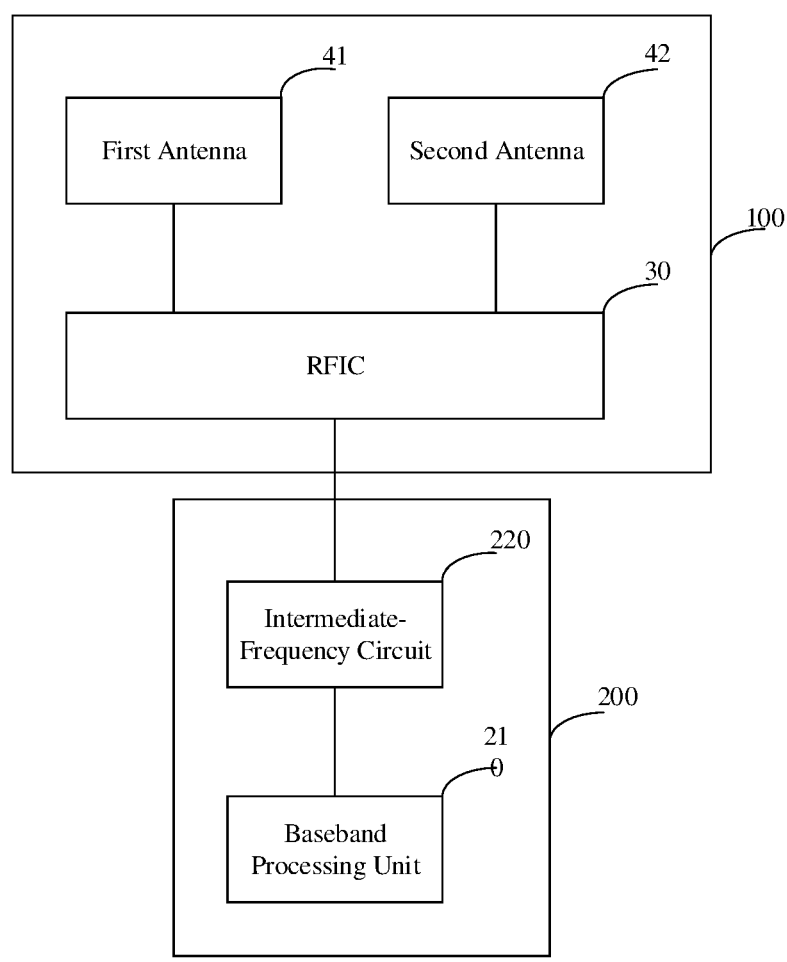
FIG. 21 is a structural block diagram of electronic equipment.

Based on the same invention concept, an embodiment of the present application further provides electronic equipment. As shown in FIG. 21, the electronic equipment includes the display apparatus 100 in the above embodiment and a system motherboard 200. The system motherboard 200 is provided with a baseband processing unit 210 and an intermediate-frequency circuit 220, and the baseband processing unit 210 is electrically connected to the RFIC 30 via the intermediate-frequency circuit 220.

Figure 22:
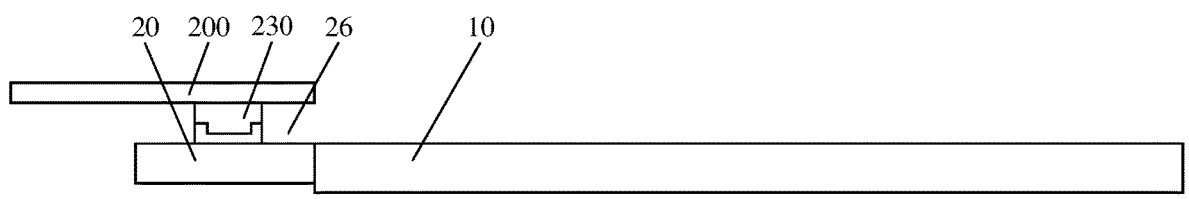
FIG. 22 is a schematic diagram of a partial structure of the electronic equipment.

In some embodiments of the present application, as shown in FIG. 22, the electronic equipment further includes a first connecting base 26 arranged on the FPC 20, the system motherboard 200 is provided with a second connecting base 230 matching the first connecting base 26, and the second connecting base 230 is electrically connected to the first connecting base 26. In this way, the system motherboard 200 and the FPC 20 are electrically connected via the first connecting base 26 and the second connecting base 230 to realize signal transmission, and the structure is easy to disassemble.

Specifically, the first connecting base 26 is a male connector, and the second connecting base 230 is a female connector; or the first connecting base 26 is a female connector, and the second connecting base 230 is a male connector.

In some embodiments of the present application, the RFIC 30 is arranged on the system motherboard 200, which, compared with the RFIC 30 being arranged on the FPC 20, may reduce the size of the FPC 20 and benefits the integration of the electronic equipment.

In some other embodiments of the present application, the RFIC 30 is arranged on the FPC 20, which may reduce a length of a transmission line to improve antenna radiation performance.

In practical applications, when the first antenna element and the second antenna element are configured as millimeter-wave antennas, the RFIC 30 is generally arranged on the FPC 20; when the first antenna element and the second antenna element are configured as non-millimeter-wave antennas, the RFIC 30 is generally arranged on the system motherboard 200.

In some embodiments of the present application, the baseband processing unit 210 is configured to determine the first antenna element as a target antenna element when received signal strength of the first antenna element is greater than received signal strength of the second antenna element and when the received signal strength of the first antenna element is greater than or equal to a preset threshold; determine the second antenna element as a target antenna element when the received signal strength of the second antenna element is greater than the received signal strength of the first antenna element and when the received signal strength of the second antenna element is greater than or equal to the preset threshold; determine one of the first antenna element and the second antenna element as a target antenna element when the received signal strength of the first antenna element is equal to the received signal strength of the second antenna element and when the received signal strength of the first antenna element and the received signal strength of the second antenna element are both greater than or equal to the preset threshold; and determine the first antenna element and the second antenna element as target antenna elements when the received signal strength of the first antenna element and the received signal strength of the second antenna element are both less than the preset threshold; wherein the target antenna element is configured to receive and/or transmit RF signals.

In this way, when the received signal strength of the antenna element with higher received signal strength is greater than or equal to the preset threshold, RF signals are received and transmitted using only the antenna element with higher received signal strength. Therefore, the power consumption can be reduced while the quality of communication is ensured. When the received signal strengths of the two antenna elements are less than the preset threshold, the RF signals are received and transmitted using the two antenna elements at the same time, so as to ensure the quality of communication.

For example, the baseband processing unit 210 determines a target antenna every a set interval.

In practical applications, a communication environment may change constantly. At one moment, received signal strength of the first antenna element may be greater than received signal strength of the second antenna element, but at next moment, the received signal strength of the second antenna element may be greater than the received signal strength of the first antenna element. In this embodiment, the baseband processing unit 210 determines a target antenna element every a set interval, and the target antenna element may be correspondingly adjusted based on a change in the communication environment, so as to ensure the quality of communication.

It may be understood that the electronic equipment in the embodiment of the present application may be any product or component having a display function such as an OLED display apparatus, an QLED display apparatus, electronic paper, a cellphone, a tablet computer, a TV set, a display, a notebook computer, a digital picture frame, a navigator, a wearable equipment and an Internet of Things equipment, which is not limited in the embodiment of the present application.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present invention, and their description is specific and detailed, but cannot therefore be understood as a limitation on the patent scope of the invention. It should be noted that those of ordinary skill in the art may further make variations and improvements without departing from the conception of the present invention, and these all fall within the protection scope of the present invention. Therefore, the patent protection scope of the present invention should be subject to the appended claims.

What is claimed is:

1. An antenna integrated display screen, wherein the display screen comprises:
   a plurality of antenna elements, comprising first antenna elements and second antenna elements having a different polarization direction from that of the first antenna elements;
   wherein at least one of the first antenna elements constitutes a first antenna and at least one of the second antenna elements constitutes a second antenna;
   the display screen comprises an edge region, and at least one of the first antenna and the second antenna is arranged in the edge region; the plurality of first antenna elements and the plurality of second antenna elements are arranged alternately in the edge region; and
   the first antenna element and the second antenna element each comprise a radiation portion and a feed portion; an orthographic projection area of the radiation portion of the first antenna element on a substrate of the display screen is different from an orthographic projection area of the radiation portion of the second antenna element on the substrate of the display screen.

2. The display screen according to claim 1, wherein the first antenna elements and the second antenna elements are arranged nonlinearly.

3. The display screen according to claim 1, wherein distances between two adjacent antenna elements are different.

4. The display screen according to claim 1, wherein the edge region comprises a first edge region, a second edge region and a third edge region connected in sequence, the first edge region is opposite to the third edge region; and
   the antenna element arranged in the first edge region is arranged in an alignment with the antenna element arranged in the third edge region;
   or, the antenna element arranged in the first edge region is misaligned with the antenna element arranged in the third edge region.

5. The display screen according to claim 1, wherein the polarization direction of the first antenna element is orthogonal to the polarization direction of the second antenna element.

6. The display screen according to claim 1, wherein the first antenna element and the second antenna element are arranged alternately;
   or, wherein the plurality of first antenna elements form a plurality of first antenna element groups, and each of the first antenna element groups comprises at least two of the first antenna elements; the plurality of second antenna elements form a plurality of second antenna element groups, and each of the second antenna element groups comprises at least two of the second antenna elements; and
   the first antenna element groups and the second antenna element groups are arranged alternately.

7. The display screen according to claim 6, wherein orthographic projection areas of the radiation portions of the first antenna elements in a same first antenna element group on the substrate of the display screen are different, and orthographic projection areas of the radiation portions of the second antenna elements in a same second antenna element group on the substrate of the display screen are different.

8. The display screen according to claim 6, wherein orthographic projection areas of the radiation portions of the first antenna elements in different first antenna element groups on the substrate of the display screen are different, and orthographic projection areas of the radiation portions of the second antenna elements in different second antenna element groups on the substrate of the display screen are different.

9. The display screen according to claim 1, wherein the display screen comprises a display panel and a touch panel, the display panel comprising a conductive mesh layer; and the first antenna element and the second antenna element are formed by at least part of a pattern in the conductive mesh layer.

10. A display apparatus comprising:
    the display screen according to claim 1;

a Flexible Printed Circuit (FPC) electrically connected to the display screen; and a Radio Frequency Integrated Circuit (RFIC), the RFIC being electrically connected to the first antenna element and the second antenna element respectively.

11. The display apparatus according to claim 10, wherein the FPC is provided with a first Radio Frequency (RF) signal line correspondingly connected to the first antenna element, and the first antenna element is electrically connected to the RFIC via the corresponding first RF signal line; and the FPC is provided with a second RF signal line correspondingly connected to the second antenna element, and the second antenna element is electrically connected to the RFIC via the corresponding second RF signal line.

12. Electronic equipment, comprising:

the display apparatus according to claim 10; and a system motherboard provided with a baseband processing unit and an intermediate-frequency circuit, the baseband processing unit being electrically connected to the RFIC via the intermediate-frequency circuit.

13. The electronic equipment according to claim 12, wherein the baseband processing unit is configured to determine the first antenna element as a target antenna element when received signal strength of the first antenna element is greater than received signal strength of the second antenna element and the received signal strength of the first antenna element is greater than or equal to a preset threshold;

determine the second antenna element as a target antenna element when the received signal strength of the second antenna element is greater than the received signal strength of the first antenna element and the received signal strength of the second antenna element is greater than or equal to the preset threshold;

determine one of the first antenna element and the second antenna element as a target antenna element when the received signal strength of the first antenna element is equal to the received signal strength of the second antenna element and the received signal strength of the first antenna element and the received signal strength of the second antenna element are both greater than or equal to the preset threshold; and determine the first antenna element and the second antenna element as target antenna elements when the received signal strength of the first antenna element and the received signal strength of the second antenna element are both less than the preset threshold;

wherein the target antenna element is configured to receive and/or transmit RF signals.

* * * * *